United States Patent
Park et al.

(10) Patent No.: US 12,079,884 B2
(45) Date of Patent: Sep. 3, 2024

(54) AUTOMATED MEMORY CREATION AND RETRIEVAL FROM MOMENT CONTENT ITEMS

(71) Applicant: Meta Platforms Technologies, LLC, Menlo Park, CA (US)

(72) Inventors: Hyunbin Park, Redwood City, CA (US); Chengxuan Bai, San Mateo, CA (US); Jiemin Zhang, Sunnyvale, CA (US); Vincent Charles Cheung, San Carlos, CA (US); Andrew Pitcher Thompson, Tarrytown, NY (US); Maheen Sohail, San Francisco, CA (US); Tali Zvi, San Carlos, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 586 days.

(21) Appl. No.: 17/234,719

(22) Filed: Apr. 19, 2021

(65) Prior Publication Data
US 2022/0335538 A1 Oct. 20, 2022

(51) Int. Cl.
*G06F 16/00* (2019.01)
*G06F 16/901* (2019.01)
(Continued)

(52) U.S. Cl.
CPC ......... *G06Q 50/01* (2013.01); *G06F 16/9024* (2019.01); *G06F 16/9535* (2019.01)

(58) Field of Classification Search
None
See application file for complete search history.

(56) References Cited

U.S. PATENT DOCUMENTS

| | | | |
|---|---|---|---|
| 7,869,658 B2 * | 1/2011 | Blose | G06F 16/51 |
| | | | 382/224 |
| 10,318,574 B1 * | 6/2019 | Bonechi | G06F 16/447 |

(Continued)

FOREIGN PATENT DOCUMENTS

EP 1681640 A2 7/2006

OTHER PUBLICATIONS

Wang Y.C., et al., "Can You be More Social? Injecting Politeness and Positivity into Task-Oriented Conversational Agents," arXiv: 2012.14653v1, Dec. 29, 2020, 13 pages.

(Continued)

*Primary Examiner* — Debbie M Le
(74) *Attorney, Agent, or Firm* — Potomac Law Group, PLLC; Dannon G. Allbee

(57) ABSTRACT

The present embodiments relate to automated memory creation and retrieval from moment content items. In some implementations, the automated memory creation and retrieval system can obtain moment content items from user-designated sources with a single user perspective or multiple user perspectives. The moment content items can be assigned tags and arranged in chronological order. The arranged moment content items can be clustered into memory content items based on clustering conditions. Once memory content items are created, they can be arranged into a memory hierarchy made up of connected nodes. In some implementations, the memory content items are also linked together based on similarity in various dimensions in a memory graph. The automated memory creation and retrieval system can receive search criteria for memories from a user interface and provide the user with memories from matched nodes in the memory hierarchy or linked memories in the memory graph.

20 Claims, 20 Drawing Sheets

(51) Int. Cl.
*G06F 16/9535* (2019.01)
*G06Q 50/00* (2012.01)

(56) References Cited

U.S. PATENT DOCUMENTS

| | | | |
|---|---|---|---|
| 10,324,973 B2* | 6/2019 | Circlaeys | G06F 16/51 |
| 11,397,759 B1* | 7/2022 | Park | G06F 16/2228 |
| 2003/0144055 A1 | 7/2003 | Guo et al. | |
| 2005/0027712 A1* | 2/2005 | Gargi | G06F 16/54 |
| 2005/0097120 A1* | 5/2005 | Cooper | G06F 16/58 |
| | | | 707/999.102 |
| 2006/0153460 A1* | 7/2006 | Kim | G06F 16/5854 |
| | | | 707/E17.026 |
| 2012/0221567 A1 | 8/2012 | Finkelstein et al. | |
| 2012/0265819 A1 | 10/2012 | McGann et al. | |
| 2012/0290950 A1 | 11/2012 | Rapaport et al. | |
| 2014/0161356 A1 | 6/2014 | Tesch et al. | |
| 2015/0382047 A1 | 12/2015 | Van Os et al. | |
| 2016/0026919 A1 | 1/2016 | Kaisser et al. | |
| 2016/0117347 A1 | 4/2016 | Nielsen et al. | |
| 2016/0357872 A1 | 12/2016 | Fader et al. | |
| 2016/0371276 A1 | 12/2016 | Furtado et al. | |
| 2017/0169101 A1 | 6/2017 | Walia et al. | |
| 2017/0242886 A1 | 8/2017 | Jolley et al. | |
| 2017/0293610 A1 | 10/2017 | Tran | |
| 2018/0018372 A1 | 1/2018 | Franke | |
| 2018/0024989 A1 | 1/2018 | Bharti et al. | |
| 2018/0136615 A1 | 5/2018 | Kim et al. | |
| 2018/0173698 A1 | 6/2018 | Dubey et al. | |
| 2018/0233141 A1 | 8/2018 | Solomon et al. | |
| 2019/0042988 A1 | 2/2019 | Brown et al. | |
| 2019/0087500 A1 | 3/2019 | Danyluk et al. | |
| 2019/0108286 A1 | 4/2019 | Pan et al. | |
| 2019/0189019 A1 | 6/2019 | Hammersley et al. | |
| 2019/0251716 A1 | 8/2019 | Nelson | |
| 2020/0117858 A1 | 4/2020 | Freeman et al. | |
| 2020/0125575 A1 | 4/2020 | Ghoshal et al. | |
| 2020/0233863 A1 | 7/2020 | King | |
| 2020/0233893 A1 | 7/2020 | He et al. | |
| 2020/0272855 A1 | 8/2020 | Kang et al. | |
| 2020/0357382 A1 | 11/2020 | Ogawa et al. | |
| 2020/0372075 A1 | 11/2020 | Rogynskyy et al. | |
| 2020/0380973 A1 | 12/2020 | Novitchenko et al. | |
| 2021/0136205 A1 | 5/2021 | Adibi et al. | |
| 2021/0150541 A1 | 5/2021 | Gurbuxani et al. | |
| 2021/0158071 A1 | 5/2021 | Yoshida et al. | |
| 2021/0203784 A1 | 7/2021 | Konig et al. | |
| 2021/0256452 A1 | 8/2021 | Lavigne et al. | |
| 2021/0405908 A1 | 12/2021 | Bassett | |
| 2022/0179665 A1 | 6/2022 | Rathod | |
| 2022/0199079 A1 | 6/2022 | Hanson et al. | |

OTHER PUBLICATIONS

Lee L.S., et al., "Spoken Content Retrieval-Beyond Cascading Speech Recognition with Text Retrieval," IEEE/ACM Transactions on Audio, Speech, and Language Processing, Sep. 2015, vol. 23, No. 9, pp. 1389-1420, DOI: 10.1109/TASLP.2015.2438543.

International Preliminary Report on Patentability for International Application No. PCT/US2021/063400, mailed Jul. 13, 2023, 9 pages.

International Search Report and Written Opinion for International Application No. PCT/US2022/023261, mailed Jul. 15, 2022, 8 pages.

Bhargava A., et al., "Easy Contextual Intent Prediction and Slot Detection," IEEE International Conference on Acoustics, Speech and Signal Processing, 2013, pp. 8337-8341, DOI: 10.11 09/ICASSP.2013.6639291.

International Search Report and Written Opinion for International Application No. PCT/US2021/063400, mailed Mar. 9, 2022, 10 pages.

D'Haro L.F., et al., "Automatic Ranking of Swear Words using Word Embeddings and Pseudo-Relevance Feedback," 2015 Asia-Pacific Signal and Information Processing Association Annual Summit and Conference (APSIPA), Dec. 2015, pp. 815-820.

* cited by examiner

AUTOMATED MEMORY CREATION AND RETRIEVAL FROM MOMENT CONTENT ITEMS

CROSS-REFERENCE TO RELATED APPLICATIONS

This application is related to U.S. patent application Ser. No. 17/234,697, titled "AUTOMATED MEMORY CREATION AND RETRIEVAL FROM MOMENT CONTENT ITEMS," filed on Apr. 19, 2021 and U.S. patent application Ser. No. 17/234,716, titled "AUTOMATED MEMORY CREATION AND RETRIEVAL FROM MOMENT CONTENT ITEMS," filed on Apr. 19, 2021, which are both herein incorporated by reference in their entireties.

TECHNICAL FIELD

The present disclosure is directed to processes, systems, and data structures for the creation of groups of semantically related content items ("memories") and intelligent retrieval and browsing of such memory content items.

BACKGROUND

Technological advances have enabled users to easily capture events (e.g., vacations, birthdays, graduations, weddings, etc.) with phones, drones, artificial reality devices, or other recording devices. For example, many users have a large collection of thousands of images that they manually organize or that are arranged by capture date. In such cases, users must scroll through these thousands of photos to recall an event, with few automatic organizational and search features other than by a timestamp. Even in systems that provide some basic tagging based on object recognition in images, the resulting grouping and search functionality fails to allow users to locate sets of content items that relate to concepts other than depicted, basic objects or that have relationships between temporally disparate content items.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
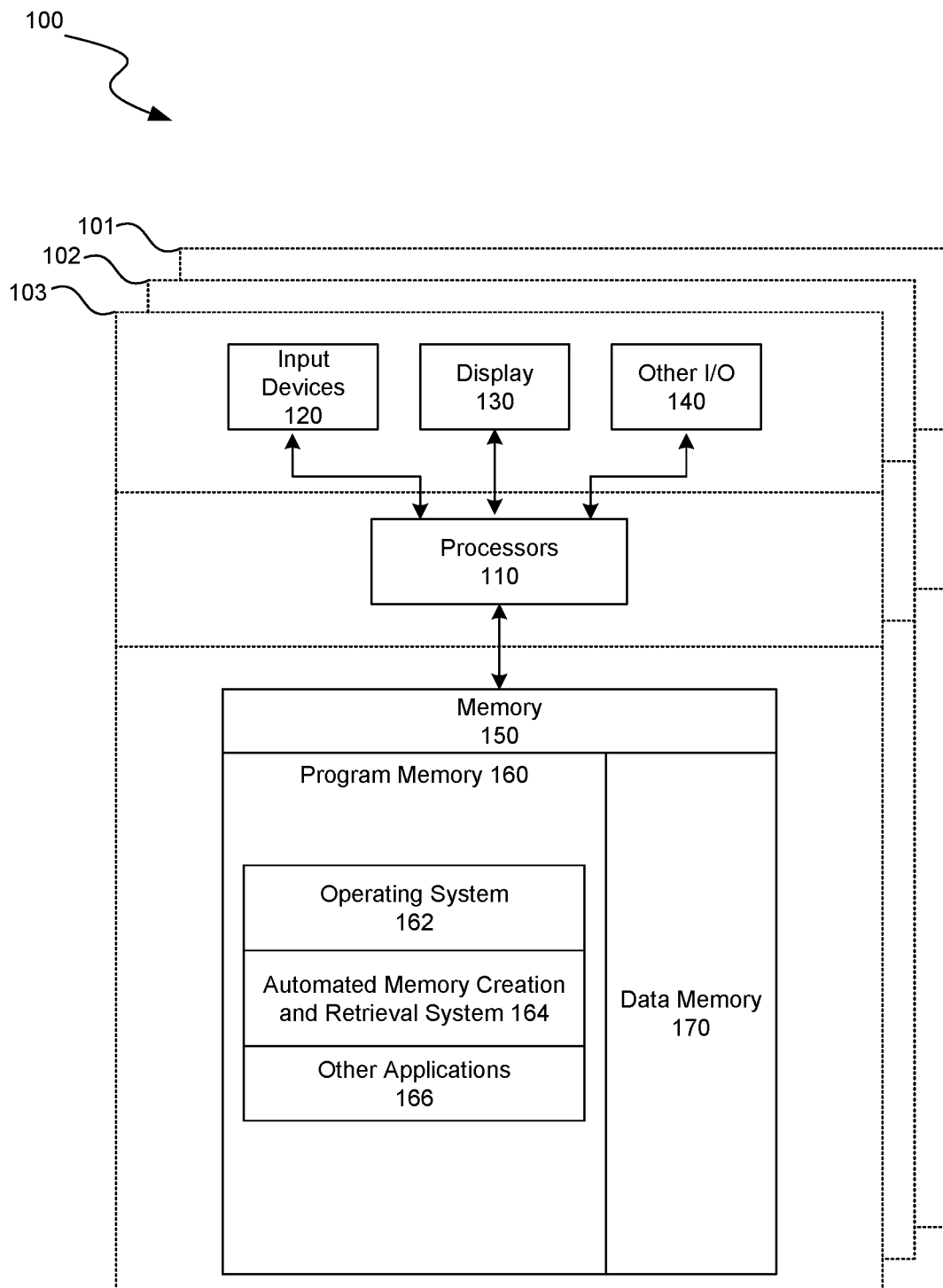
FIG. 1 is a block diagram illustrating an overview of devices on which some implementations of the present technology can operate.

Aspects of the present disclosure are directed to automated memory creation and retrieval from moment content items. In some implementations, the automated memory creation and retrieval system can obtain moment content items (e.g., images, videos, audio recordings, messages, etc.) from user-designated sources with a single user perspective or multiple user perspectives. The automated memory creation and retrieval system can semantically cluster these into "memory content items" or "memories." The automated memory creation and retrieval system can accomplish this by assigning tags to the moment content items and arranging the moment content items in a chronological order. In some cases, the moment content items are aligned based on multiple factors such as location, identified activities, or identified users in the moment content items. The arranged/aligned moment content items are clustered into memories based on clustering conditions including A) the time associated with each moment content item added to a memory is within a time threshold of at least one other moment content item in that memory and B) a match score between the moment content items in a memory being above a threshold. Additional details on creating a memory from multiple moment content items are provided below in relation to FIGS. 5, 6, 10, and 11.

Once memory content items are created, they can be arranged into a hierarchy where individual memory content items are leaf nodes and these memories can be combined into memory combinations when a set of the memory content items have similar features. To accomplish this, the automated memory creation and retrieval system can retrieve the memory content items and arrange the memory content items into an ordered set of leaf nodes. The automated memory creation and retrieval system can organize the memory content item by beginning a loop that ends when one or more root nodes are created, where the first iteration starts at the leaf node and each subsequent iteration of the loop moves up a level in the hierarchy. Sets of adjacent nodes, at the current level in the hierarchy, can be grouped into a higher-level node when there are a threshold number of matching features between the set of nodes. Each level requires fewer matching features as the nodes progress to a root node. In some cases, the groupings are based on tags of the memories, such as the people depicted in a memory content item, an activity taking place in the memory content item, a location associated with the memory content item, etc. Additional details on organizing multiple memories into a hierarchy are provided below in relation to FIGS. 7 and 12.

In some implementations, the automated memory creation and retrieval system establishes links between memory content items, in various dimensions (e.g., people, locations, identified activities, identified sounds (e.g., running water, laughing, yelling, etc.), identified emotions, etc.), in a graph. The automated memory creation and retrieval system can define the graph data structure for the memory content items by identifying all possible pairs of memories or certain pairs based on similar tags. After identifying memory pairs, links between some of the memory pairs, in a particular dimension, can be created when there is a threshold level of match between the memory content items in that dimension. The links (or edges) between the memory pairs can be weighted based on the relevance of match to a central concept for the given dimension. Additional details on graphing links between memories are provided below in relation to FIGS. 8 and 13.

Once memories, a memory hierarchy, and/or a memory graph are created, they can be used to surface memories to a user, e.g., in a memory app, through an artificial reality (XR) system, or in other contexts. In some implementations, the automated memory creation and retrieval system can receive memory search criteria, either explicitly from a user interface or based on the context of a user (e.g., environment information gathered by an XR device. For example, the user can search for a memory using keywords. The automated memory creation and retrieval system can create a pseudo memory based on the search criteria and/or user context. The pseudo memory can be mapped into the memory hierarchy based on the grouping criteria, as discussed above in relation to the creation of the memory hierarchy to determine which memory or memories with which the pseudo memory is most similar. The automated memory creation and retrieval system can return, to the user, memories from matched nodes in the memory hierarchy. The user can further browse through her memories based on connections in the hierarchy and/or graph using the returned memories as a starting point. Additional details on surfacing memory content items are provided below in relation to FIGS. 9 and 16.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

There are existing systems that provide basic tagging of content items based on object recognition or timestamps. These systems group content items together without providing the user the ability to locate sets of content items that relate to other concepts than depicted basic objects. Additionally, these existing systems do not provide relationships between temporally spaced content items. The automated memory creation and retrieval system and processes described herein overcome these problems associated with conventional content organization techniques and provide the user with a greater ability to search for specific memories, receive related memories to the search, and receive memories related to a user's current context, e.g., displaying memories related to what the user is currently doing or where the user is currently located. The automated memory creation and retrieval system can automatically select memories matching user-provided search criteria or user context, e.g., from a voice or textual command in a manner that significantly increases efficiency with faster selection, less need to check multiple repositories, and more effective communication. Through automatic selection of memories matching search criteria or user context, using sophisticated selection models, content item constraints, and contextual signals, content item retrieval programs and artificial reality systems (or other systems that select content items) can be more informative and effective, faster, and more engaging. The automated memory creation and retrieval system and processes described herein are rooted in computerized machine learning and data structuring systems, instead of being an analog of human activities for browsing for memory content items or other selection techniques. For example, existing content selection systems require significant knowledge of where to look and what a user is looking for to make an effective search. The automated memory creation and retrieval system, to the contrary, allows a user to merely speak, type, or look at objects, and have relevant sets of content items, organized as memories, provided.

Several implementations are discussed below in more detail in reference to the figures. FIG. 1 is a block diagram illustrating an overview of devices on which some implementations of the disclosed technology can operate. The devices can comprise hardware components of a computing system 100 that creates and retrieves memory content items automatically. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, the automated memory creation and retrieval system 164, and other application programs 166. Memory 150 can also include data memory 170 that can include moment content item data, memory content item data, tag data, cluster data, location data, activity data, user data, semantic identifier data, hierarchy data, graph structure data, node data, search criteria data, pseudo memory data, mapping data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
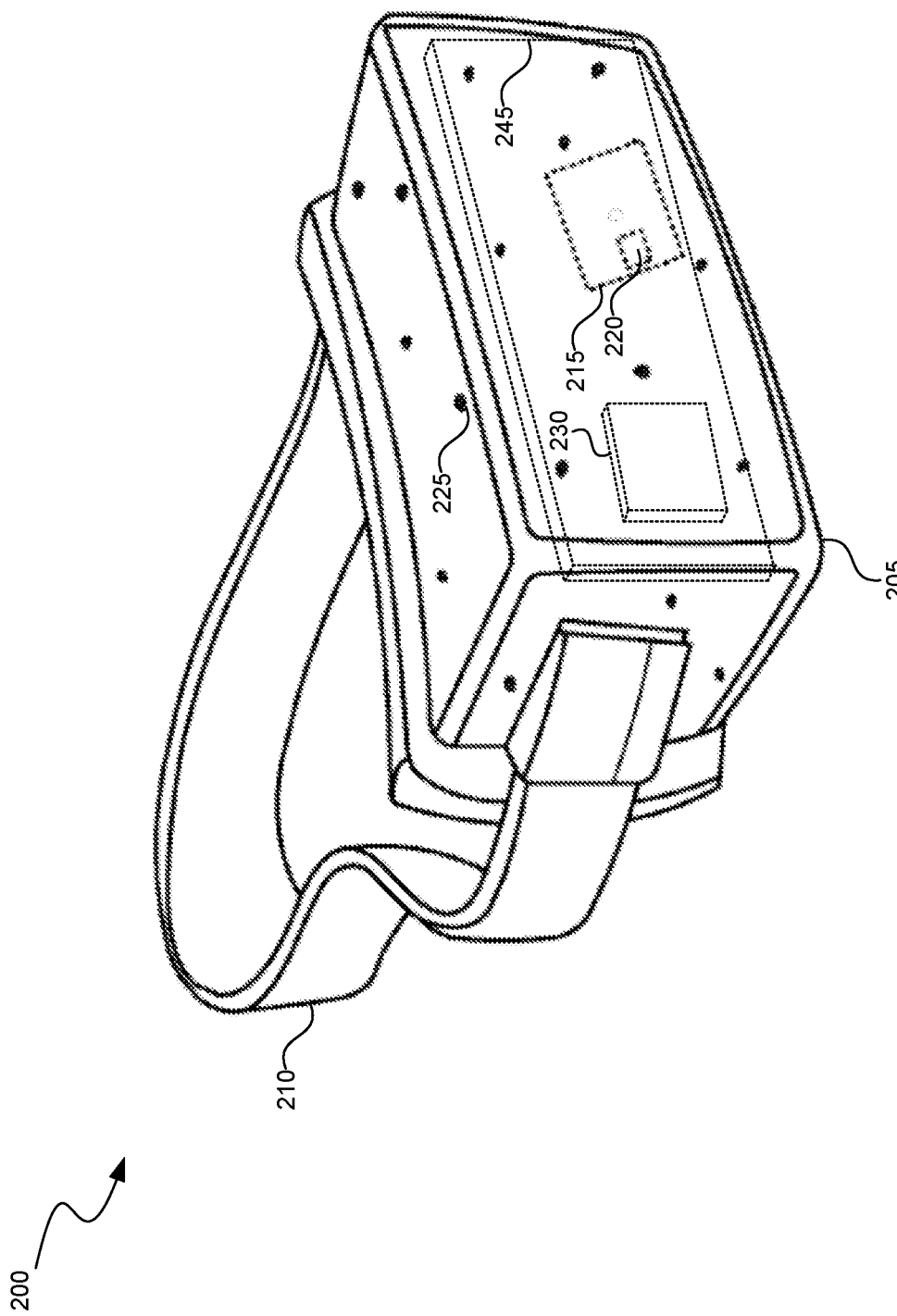
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
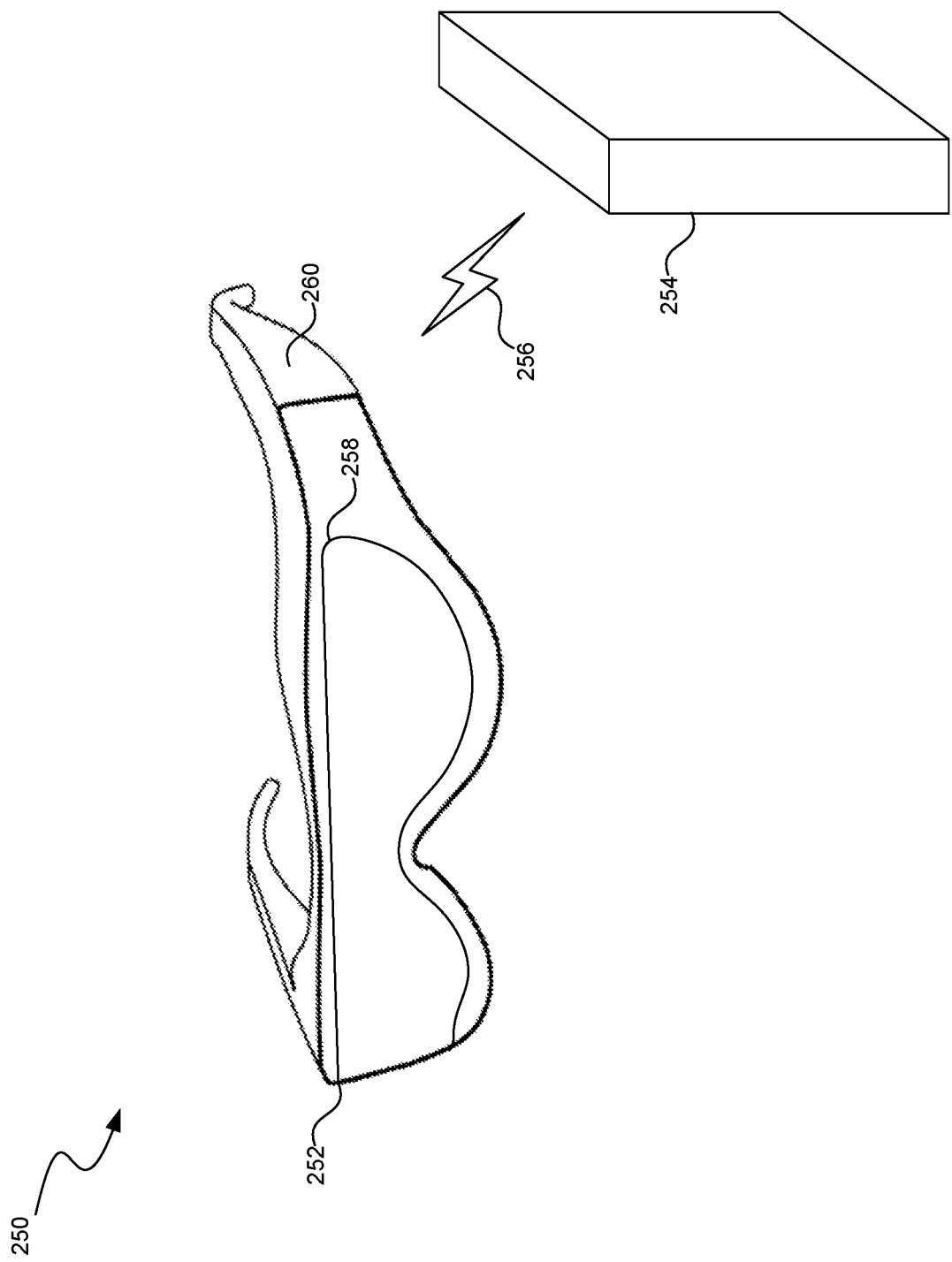
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
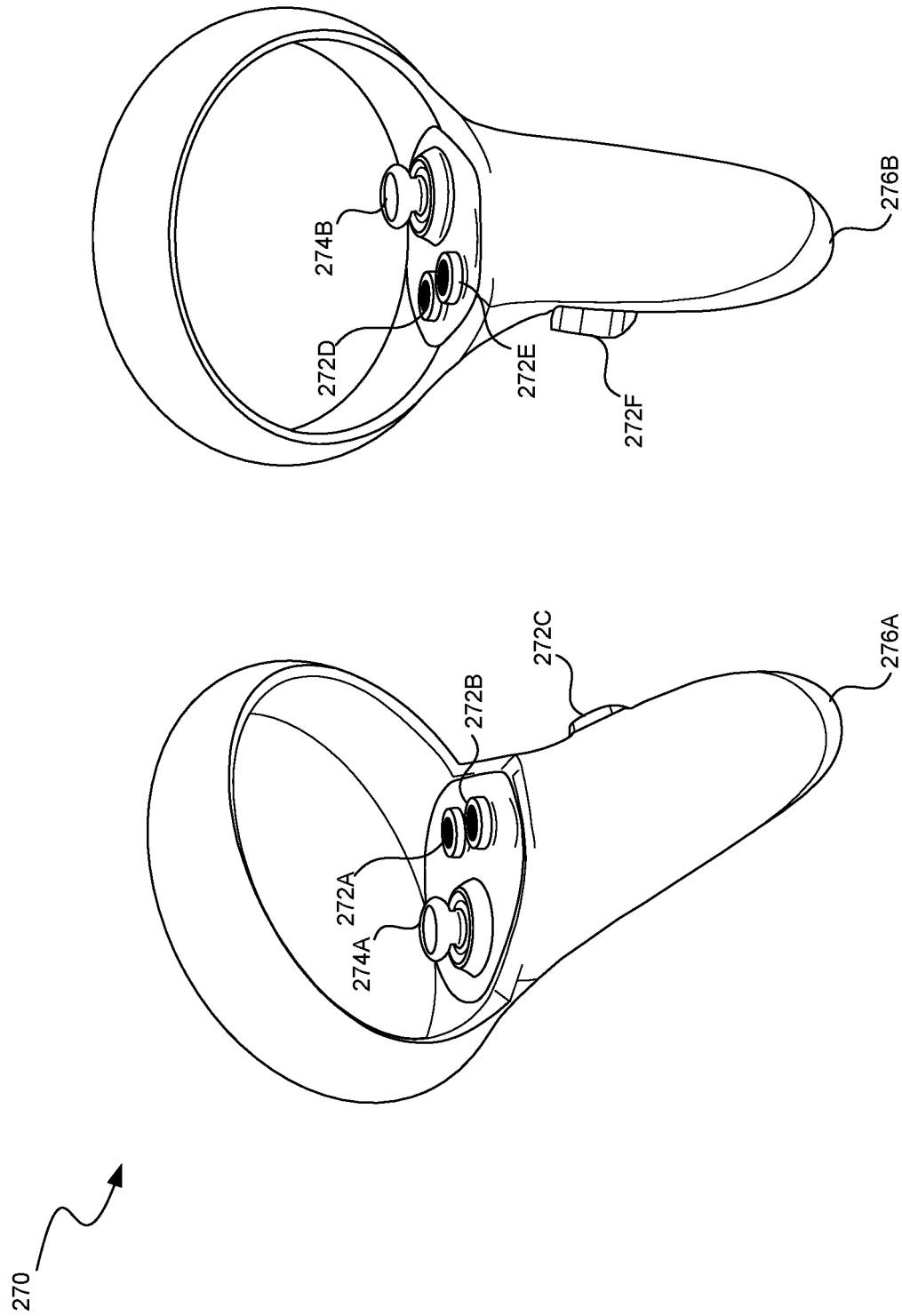
FIG. 2C is a wire diagram illustrating controllers, which, in some implementations, a user can hold in one or both hands to interact with an artificial reality environment.

FIG. 2C illustrates controllers 270, which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc. To monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions.

Figure 3:
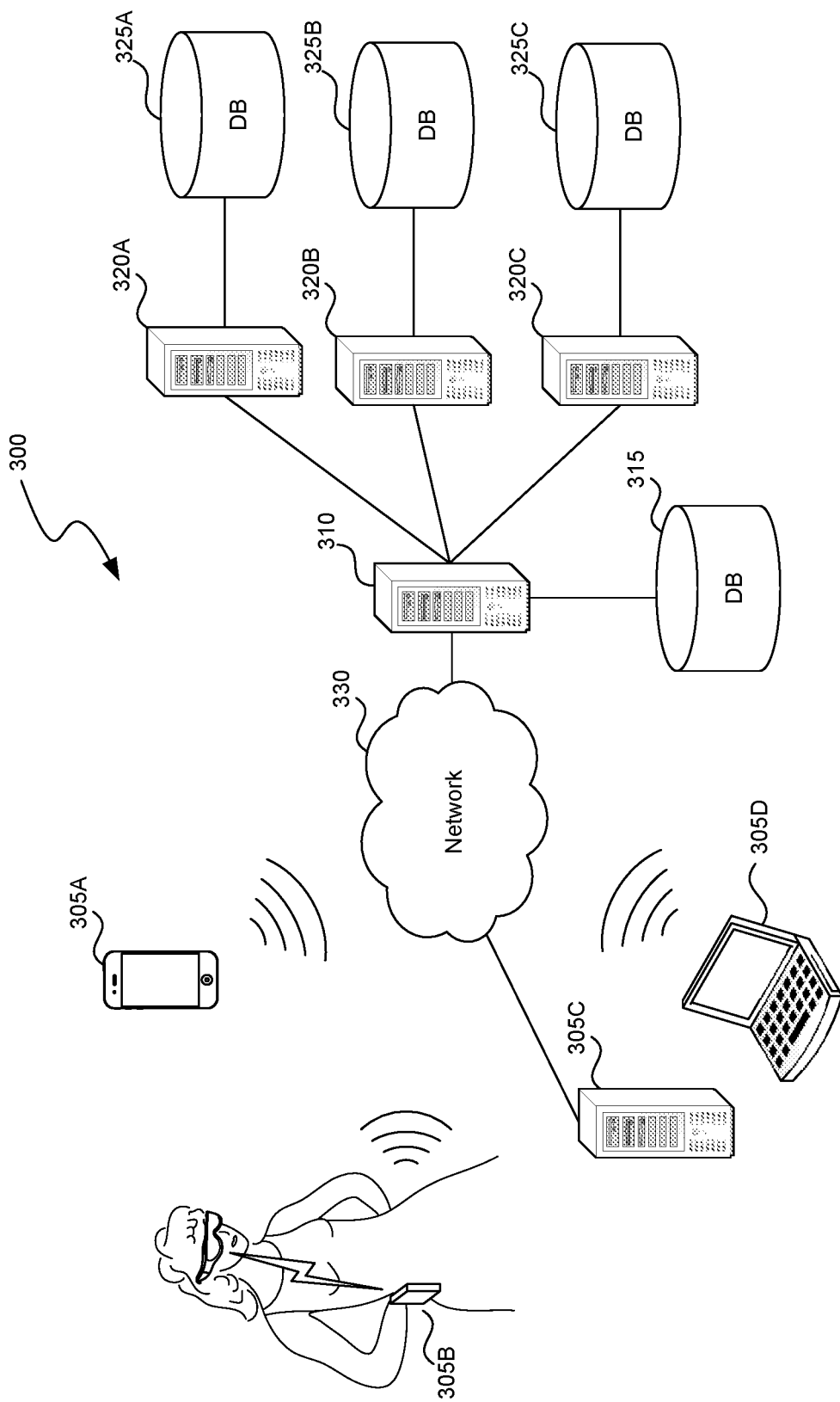
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

In some implementations, servers 310 and 320 can be used as part of a social network. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc. Content items can be any digital data such as text, images, audio, video, links, webpages, minutia (e.g., indicia provided from a client device such as emotion indicators, status text snippets, location indictors, etc.), or other multi-media. In various implementations, content items can be social network items or parts of social network items, such as posts, likes, mentions, news items, events, shares, comments, messages, other notifications, etc. Subjects and concepts, in the context of a social graph, comprise nodes that represent any person, place, thing, or idea.

A social networking system can enable a user to enter and display information related to the user's interests, age/date of birth, location (e.g., longitude/latitude, country, region, city, etc.), education information, life stage, relationship status, name, a model of devices typically used, languages identified as ones the user is facile with, occupation, contact information, or other demographic or biographical information in the user's profile. Any such information can be represented, in various implementations, by a node or edge between nodes in the social graph. A social networking system can enable a user to upload or create pictures, videos, documents, songs, or other content items, and can enable a user to create and schedule events. Content items can be represented, in various implementations, by a node or edge between nodes in the social graph.

A social networking system can enable a user to perform uploads or create content items, interact with content items or other users, express an interest or opinion, or perform other actions. A social networking system can provide various means to interact with non-user objects within the social networking system. Actions can be represented, in various implementations, by a node or edge between nodes in the social graph. For example, a user can form or join groups, or become a fan of a page or entity within the social networking system. In addition, a user can create, download, view, upload, link to, tag, edit, or play a social networking system object. A user can interact with social networking system objects outside of the context of the social networking system. For example, an article on a news web site might have a "like" button that users can click. In each of these instances, the interaction between the user and the object can be represented by an edge in the social graph connecting the node of the user to the node of the object. As another example, a user can use location detection functionality (such as a GPS receiver on a mobile device) to "check in" to a particular location, and an edge can connect the user's node with the location's node in the social graph.

A social networking system can provide a variety of communication channels to users. For example, a social networking system can enable a user to email, instant message, or text/SMS message, one or more other users. It can enable a user to post a message to the user's wall or profile or another user's wall or profile. It can enable a user to post a message to a group or a fan page. It can enable a user to comment on an image, wall post or other content item created or uploaded by the user or another user. And it can allow users to interact (via their personalized avatar) with objects or other avatars in a virtual environment, etc. In some embodiments, a user can post a status message to the user's profile indicating a current event, state of mind, thought, feeling, activity, or any other present-time relevant communication. A social networking system can enable users to communicate both within, and external to, the social networking system. For example, a first user can send a second user a message within the social networking system, an email through the social networking system, an email external to but originating from the social networking system, an instant message within the social networking system, an instant message external to but originating from the social networking system, provide voice or video messaging between users, or provide a virtual environment were users can communicate and interact via avatars or other digital representations of themselves. Further, a first user can comment on the profile page of a second user, or can comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection can be an edge in the social graph. Being friends or being within a threshold number of friend edges on the social graph can allow users access to more information about each other than would otherwise be available to unconnected users. For example, being friends can allow a user to view another user's profile, to see another user's friends, or to view pictures of another user. Likewise, becoming friends within a social networking system can allow a user greater access to communicate with another user, e.g., by email (internal and external to the social networking system), instant message, text message, phone, or any other communicative interface. Being friends can allow a user access to view, comment on, download, endorse or otherwise interact with another user's uploaded content items. Establishing connections, accessing user information, communicating, and interacting within the context of the social networking system can be represented by an edge between the nodes representing two social networking system users.

In addition to explicitly establishing a connection in the social networking system, users with common characteristics can be considered connected (such as a soft or implicit connection) for the purposes of determining social context for use in determining the topic of communications. In some embodiments, users who belong to a common network are considered connected. For example, users who attend a common school, work for a common company, or belong to a common social networking system group can be considered connected. In some embodiments, users with common biographical characteristics are considered connected. For example, the geographic region users were born in or live in, the age of users, the gender of users and the relationship status of users can be used to determine whether users are connected. In some embodiments, users with common interests are considered connected. For example, users' movie preferences, music preferences, political views, religious views, or any other interest can be used to determine whether users are connected. In some embodiments, users who have taken a common action within the social networking system are considered connected. For example, users who endorse or recommend a common object, who comment on a common content item, or who RSVP to a common event can be considered connected. A social networking system can utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

Figure 4:
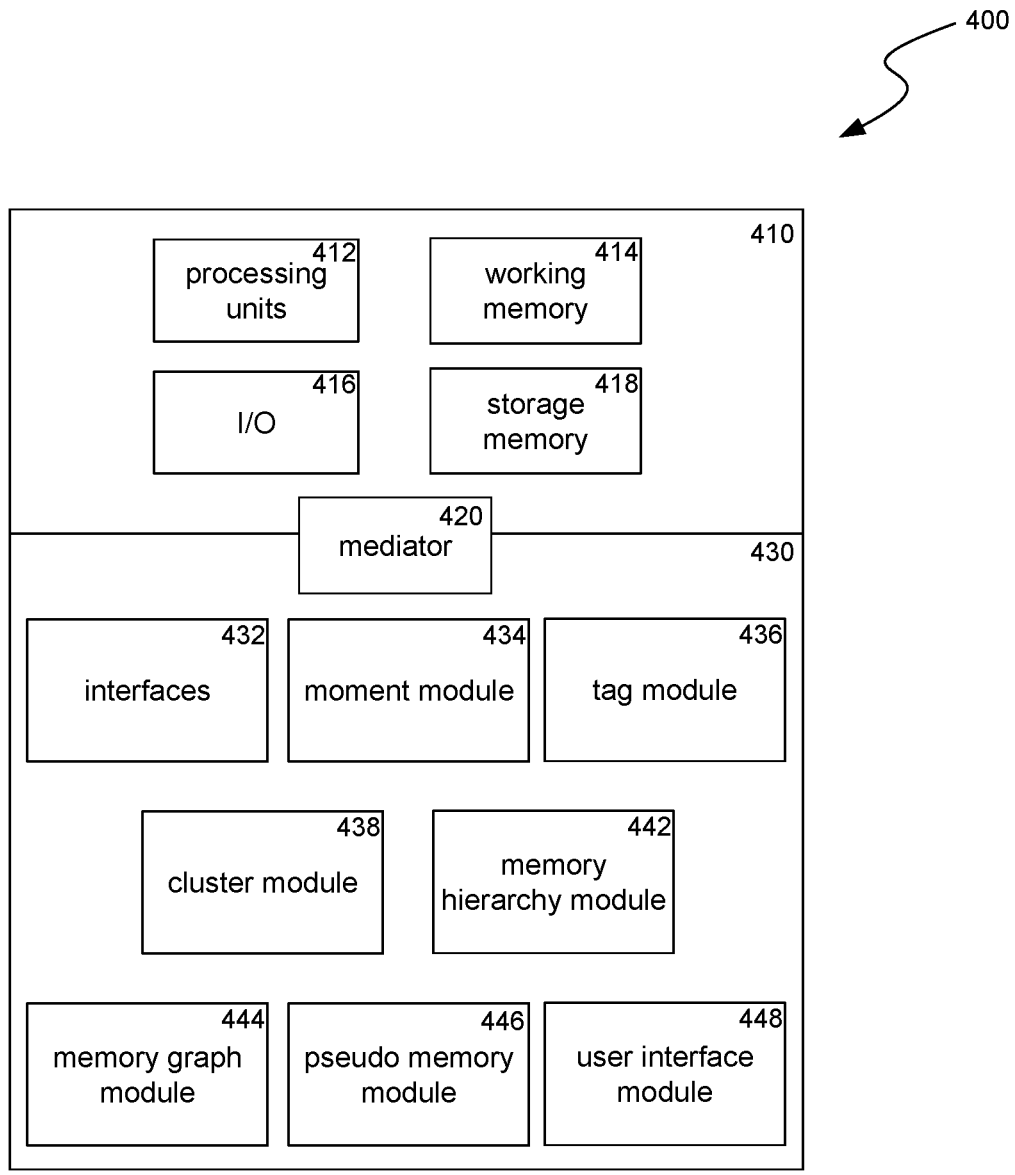
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for automated memory creation and retrieval from moment content items. Specialized components 430 can include moment module 434, tag module 436, cluster module 438, memory hierarchy module 442, memory graph module 444, pseudo memory module 446, user interface module 448, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

In some embodiments, the moment module 434 is configured to collect moment content items from one or more user-designated sources. Moment content items can include content items such as images, videos, audio recordings, emails, texts, etc. In various implementations, the collected moment content items can be from a single user perspective or multiple user perspectives. The moment module 434 can arrange the moment content items in a chronological order based on time data associated with each moment content item. Additional details on moment content items are provided below in relation to blocks 502, 504, and 506 in FIG. 5 and blocks 602, 604, and 606 in FIG. 6.

In some embodiments, the tag module 436 is configured to assign tags to the moment content items. The tag module 436 can add semantic identifiers to the moment content items by tagging them. The semantic identifiers can indicate detected aspects of the moment content items such as people, objects, words, emotions, locations, audio, etc. The tags assigned to the moment content items can be used to group the moment content items into memories based on similarities in the assigned tags. Additional details on tagging moment content items are provided below in relation to blocks 504 in FIG. 5 and block 604 in FIG. 6.

In some embodiments, the cluster module 438 is configured to cluster the moment content items into memory content items. The cluster module 438 can cluster the moment content items based on the chronological order of the moment content items and based on the assigned tags. The cluster module 438 can determine a group score between the moment content items based on the match level for a set of moment content items being above a threshold. Additional details on clustering moment content items are provided below in relation to block 508 in FIG. 5 and block 608 in FIG. 6.

In some embodiments, the memory hierarchy module 442 is configured to generate one or more memory hierarchies by collecting the memory content items (from cluster module 438) and arrange the memory content items, according to a chronology, into an ordered set of nodes. The memory hierarchy module 442 can then iterate through levels of nodes, combining memories into combinations when the memories have similar matching features. As the memory hierarchy module 442 moves up creating levels of the hierarchy, each level requires fewer matching features to be combined until a root node is created (e.g., a node that cannot be combined with other nodes in the hierarchy). Additional details on memory hierarchies are provided below in relation to FIGS. 7 and 12.

In some embodiments, the memory graph module 444 is configured to generate a graph memory structure by connecting pairs of memory content items with edges based on similarities between the memory content items in one or more dimensions. The memory graph module 444 can form the memory content items into pairs based on similar tags and link the pairs together in dimensions when there is a match above a threshold value for that dimension. Additional details on memory graphs are provided below in relation to FIGS. 8 and 13.

In some embodiments, the pseudo memory module 446 is configured to create a pseudo memory based on memory content item search criteria. The pseudo memory module 446 can generate the pseudo memory by using user provided criteria (e.g., words, a memory selection, etc.) and/or information currently around the user (e.g., context information gathered by an XR device). The pseudo memory module 446 can map the pseudo memory into the memory hierarchy using on the hierarchy grouping criteria and return memories from nodes with which the pseudo memory is grouped. From returned memories, the user can browse through connected memories in the hierarchy and/or graph. Additional details on creating a pseudo memory, providing related memories, and allowing the user to further browse memory content items based on the hierarchy or graph are provided below in relation to FIG. 9.

In some embodiments, the user interface module 448 is configured to obtain, from a user interface, memory content item search criteria. The user interface module 448 can receive selections of provided memories from a memory search. In some cases, the user interface module 448 gathers data from the user's current context and sends the data to the pseudo memory module 446. Additional details on user interface are provided below in relation to FIGS. 9 and 14A/14B.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
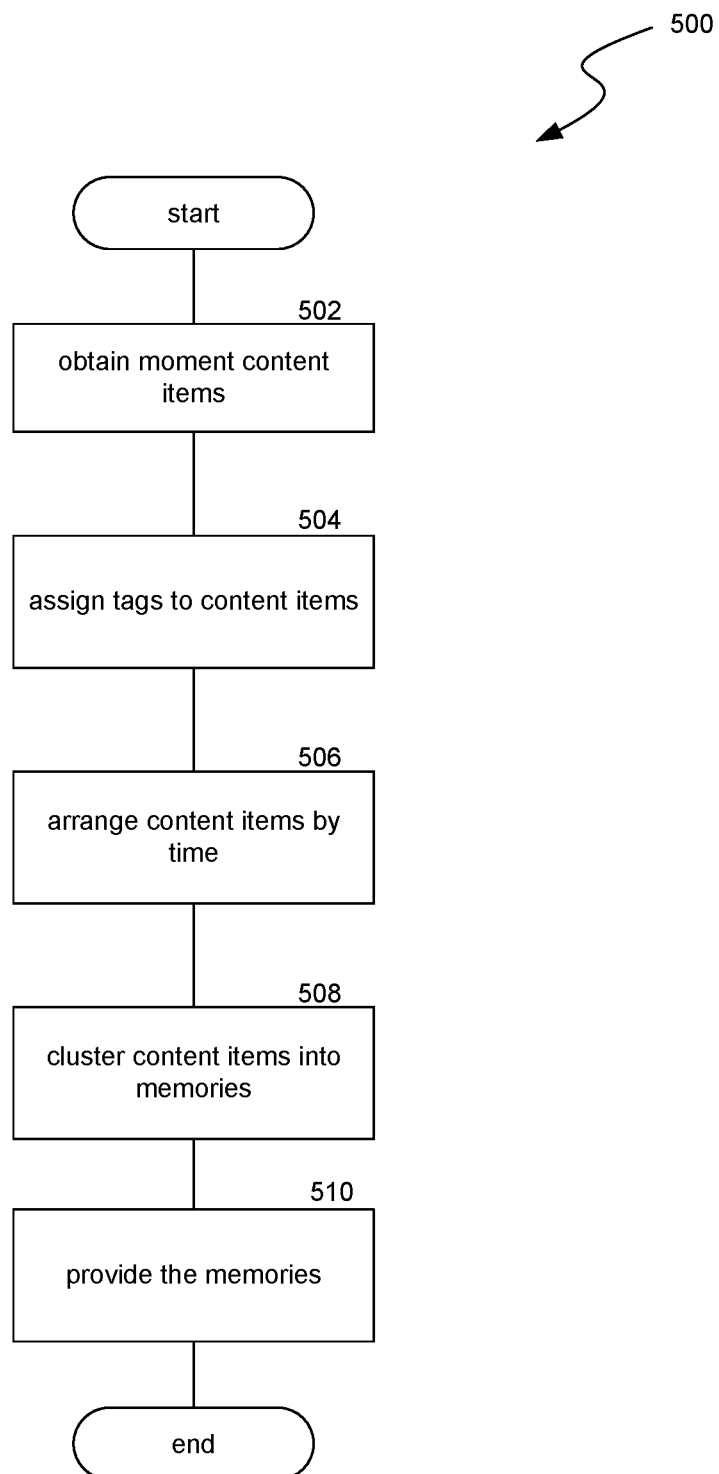
FIG. 5 is a flow diagram illustrating a process used in some implementations of the present technology for creating a memory from multiple moment content items from a user.

FIG. 5 is a flow diagram illustrating a process 500 used in some implementations of the present technology for creating a memory from multiple moment content items from a user. In some implementations, process 500 can be performed automatically as a user provides inputs, such as images, instant messages, video chats, drawings, emails, texts, social media posts, or other digital conversations or recordings. In some implementations, process 500 can be performed in response to a user action e.g., when a user adds a new content item to a repository or periodically, e.g., by organizing a user's content items into memories on a nightly basis, when there is server processing availability etc. In some cases, process 500 can be performed on a user's local device (e.g., by a phone, XR device, or automated assistant device). In some implementations, process 500 can be performed by a server-side system that is facilitating gathering content items or command data from a local system.

At block 502, process 500 can obtain moment content items from user designated sources. Examples of moment content items include images, video, audio, received or sent messages, instant messages, texts or emails, social media posts, video chats, message threads, etc. In some cases, the moment content items can include depth data (e.g., point clouds, structured light, etc.) for capturing 3D objects. Thus, memories resulting from these moment content items with depth data can be displayed as 3D objects. In some cases, moment content items can be associated with mapping data, e.g., simultaneous localization and mapping (SLAM) data. This data can be used in both the display of memories and in the determination of memory context as discussed below. In some cases, the moment content items may include AR or VR effects added to the original content items. Moment content items may be divided into multiple content items when the content items span more than one instant (e.g., non-images). For example, decomposing a video into frames or 1-second (or any time length) clips or decomposing audio into audio segments of 1-second (or any time length) clips. The moment content items can come from user designated sources (e.g., content items posted to a social media site, content items on a user device, content items in a cloud drive, etc.)

Process 500 can obtain all the moment content items in the user designated sources or filter the content items before obtaining the content items. Process 500 can filter and select the content items based on a time threshold (e.g., only use content items from the past day, week, month, year, etc.) Process 500 can filter and select the content items based on a quality threshold (e.g., exclude content items below a threshold quality, such as images identified as blurry or with below 300 pixels/sq. inch). Process 500 can filter and select the content items based on similarities in moment content items (e.g., only select one content item from a group of content items that are similar such as, where there are 5 nearly identical pictures, select the one with the highest quality score). Process 500 can identify duplicate content items using person/facial recognition, object detection, time-stamps, text recognition, speech recognition and transcription, location detection or activity detection, and select one of the duplicate moment content items. In some cases, process 500 can link non-selected content items with the selected one so the user can see the alternate versions when later browsing through a memory. In some cases, each time a new moment content item is captured, process 500 analyzes it to either assign it to an existing memory or to start a new memory.

At block 504, process 500 can assign tags to the moment content items. Assigning a tag to a moment content item can add semantic identifier(s) to the moment content item. The semantic identifiers can be based on person/face recognition in the content item, timestamps, object detection in the content item, geolocation data for the content item (e.g., based on associated meta-data and/or landmark identification in the content item), text recognition of the content item, speech recognition or transcription of the content item, emotion detection (e.g., of voice and/or of faces and body language in the content item), quality detection for the content item, or activity detection in the content item.

Process 500 can use machine learning-based classifiers to perform person/facial recognition to identify people in a moment content item. For example, process 500 may assign a person identifier (ID) to a content item if the user is known (e.g., from a social media account), or if the user is not known, process 500 may assign a face ID to the user to match between moment content items (e.g., the user is unknown but the user appears in other moment content items). Once the user is identified or assigned an ID, process 500 can tag the moment content item with the user ID. In some implementations, process 500 can use emotion engines (e.g., that heuristics and/or machine learning to analyze voice tone, expressions, body language, etc., to identify the emotion (e.g., happy, sad, excited, frustrated, etc.) of a person or persons in the content item.

Process 500 can use known object detection techniques to identify objects in moment content items and assign tags to the moment content items based on the identified objects. Each identified object can have an object type (e.g., instrument, vehicle, dwelling, etc.) and/or a specific object identifier (such as a guitar, sedan, tent, etc.) In some cases, process 500 can label the objects as associated with the user based on a threshold number of times the particular object and the user are identified in a moment content item (e.g., a particular guitar labeled as user 123's guitar). After the threshold number of times, all tags with that specific object identifier will be identified with that label. For example, "a" guitar receives the label of user 123's guitar when it is identified with the user 123 in 10 or more moment content items. In some cases, a user can adjust the label on the tag (e.g., changing "my" guitar to "roommate's" guitar).

Process 500 can use geolocation meta-data (e.g., GPS, simultaneous localization and mapping (SLAM), etc.) associated with a content item. Process 500 may identify landmarks (e.g., Eifel tower, Statue of Liberty, etc.) to determine the location of the moment content item. In some cases, process 500 can determine objects at a location to identify the location. For example, process 500 identifies objects associated with the user and determines the user is at "home". Based on these determinations, process 500 can assign the moment content item with one or more location tags.

Process 500 can use known text recognition to identify words and assign a tag to the moment content item based on the subject matter in the words. For example, the text may be written on signs, products, handwritten notes, etc., in the moment content item. In some implementations, process 500 can use speech recognition to transcribe detect spoken words and assign corresponding tags to the moment content item. Process 500 can analyze (using trained ML classifiers) recognized or transcribed text to identify a semantic topic of the text to assign a topic tag to the content item.

In some cases, process 500 can use a classifier trained to identify activities in moment content items to assign activity tags. In some cases, the activity can further be identified based on identified objects in the moment content items. For example, process 500 map certain objects or relationships between objects to activities, e.g., identifying a user in a kayak in water and assign the tag of "kayaking" to the moment content item. Such second order identifications can be accomplished using explicit mappings or a ML model trained to take identified objects and/or object relationships and output an activity.

As discussed above, in some implementations, process 500 can use heuristics and/or machine learning (ML) to assign tags to the moment content items. For example, one or more machine learning models (such as neural networks, decision trees, support vector machines, etc.) can be trained with known techniques to make individual such identifications (e.g., people, objects, activities, emotions, locations, text, etc.) for the content items. As another example, process 500 can use an ML model to compute a semantic hash for the moment content item. For instance, the ML model can generate an embedding for an image to receive a hash value that can be directly compared with the hash values of other images to get a similarity score. If a first image containing a user kayaking in Hawaii has a similar hash value to a second image, the second image can be identified as related.

Process 500 can assign the semantic identifiers for individual dimensions and/or has value as tags on each moment content item. For example, a moment content item can be tagged with an activity, location, person(s), objects, user emotion, etc.

At block 506, process 500 can determine a chronology for the moment content items and arrange the moment content items by time. The chronology can be based on a timestamp associated with the moment content item. The timestamp can be assigned to the moment content item by a device or a user (e.g., a camera application can automatically assign timestamp metadata to a recorded image or video).

At block 508, process 500 can cluster the moment content items into memory content items (e.g., memories). Process 500 can cluster moment content items into a memory according to two conditions: 1) that all the moment content items in a memory are within at least a threshold time of at least one other memory content item in that memory and 2) a score computed for the set of content items in a memory, based on a comparison of the tags assigned to those moment content items, is above a threshold. Groups of moment content items that satisfy these conditions can become a memory. In some implementations, moment content items can be in exactly one memory while in other implementations a moment content item can be in multiple memories.

In some implementations, larger groups of moment content items are preferred such that the groupings are further created to make each of the resulting memories contain as many moment content items as possible while maintaining the two conditions. In some implementations, another condition can be that a memory cannot include two moment content items that are a threshold time apart. For example, process 500 can set an upper time threshold of 24 hours so that no two moment content items that are a day apart are not clustered into the same memory. In some implementations, once process 500 has clustered moment content items individual memories, process 500 can filter out substantially duplicate moment content items or moment content items below a quality threshold.

To compute the score for condition 2), process 500 can apply a formula/model that generates a match value for the moment content items. In some implementations, this can be include comparing the hash values assigned to the individual moment content items to get an average difference. In some implementations, a model can be trained to take the tags assigned to various moment content items and produce a match score (e.g., where the model can be trained based on training items that pair two input moment content items with a similarity score). In yet further implementations, the score can be computed by determining a number of tags the moment content items have in common. For example, moment content items that have more assigned tags in common can receive a higher match value than moment content items that have less in common. In an example, each assigned tag type can have a weight allowing the comparison to take account not only how many tags each pair of moment content items in a group has in common, but also an importance of each match type. For example, tags with a location match can have a 0.6 weight, match in people can have a 0.45 weight, match in identified objects can have a 0.3 weight, match in activities can have a 0.55 weight, etc. Whether two tags "match" can be based on whether they have the same value or whether they have values that are near each other in a semantic space (e.g., as determined by an embedding determined by a ML model). In some cases, process 500 clusters the moment content items into a memory when the match value score is above a threshold match value. When the match score threshold is not met, process 500 can adjust the threshold match value or cluster the moment content items into subsets of moment cluster items.

After the moment content items are clustered into a memory (e.g., a memory is created), process 500 can filter out moment content items that are less relevant to the memory that are below a threshold quality level. For example, if the memory is for "my son riding a bike" from moment content items captured with a AR headset, and the user looked away for a few seconds (e.g., looking at a car driving past), process 500 can mark and not show (or remove) the moment content items covering those few seconds (e.g., a car driving past is less relevant to the memory of "my son riding a bike") in playback of the memory. In some cases, process 500 saves the filtered-out moment content items and includes them in the memory as additional content the user can enable or view. In some implementations, process 500 can detect the moment content items that are less relevant to a memory based on an increase in the score discussed above when recomputed without those moment content items or based on an absence of objects, activities, users from those moment content items that are detected in the other moment content items in the memory. For example, when the person identified in other content items in the memory does not appear in images of a car driving past they can be hidden in the memory of "my son riding a bike."

In some implementations, user gaze meta-data may be available for the moment content items, e.g., where the moment content item was captured by an XR device that can track the user's head and/or eye direction. This gaze information can further be used to determine if the content items are related or if a subset of them relate to a change in focus of the user. In some implementations, process 500 can determine to keep less relevant moment content items to a memory based on the amount of time the user's focus is away from (e.g., user looks away) the focus of the memory. Process 500 can determine whether to include the less relevant moment content items when the time the user's focus is away from the main event is greater than a time threshold. In some implementations, process 500 can determine whether to include the less relevant moment content items based on a function of distance, such as the distance between the main focus of the memory and the "look away" focus. For example, when the user's focus switches from watching her son ride a bike to watching a car on the road, process 500 will exclude the moment content items of the car due to the car being above a threshold distance from her son riding a bike.

At block 510, process 500 can provide the memory content items made up of clustered moment content items to the automated memory creation and retrieval system, e.g., for adding to a memory hierarchy and/or memory graph as discussed below and/or for direct user browsing.

Figure 10:
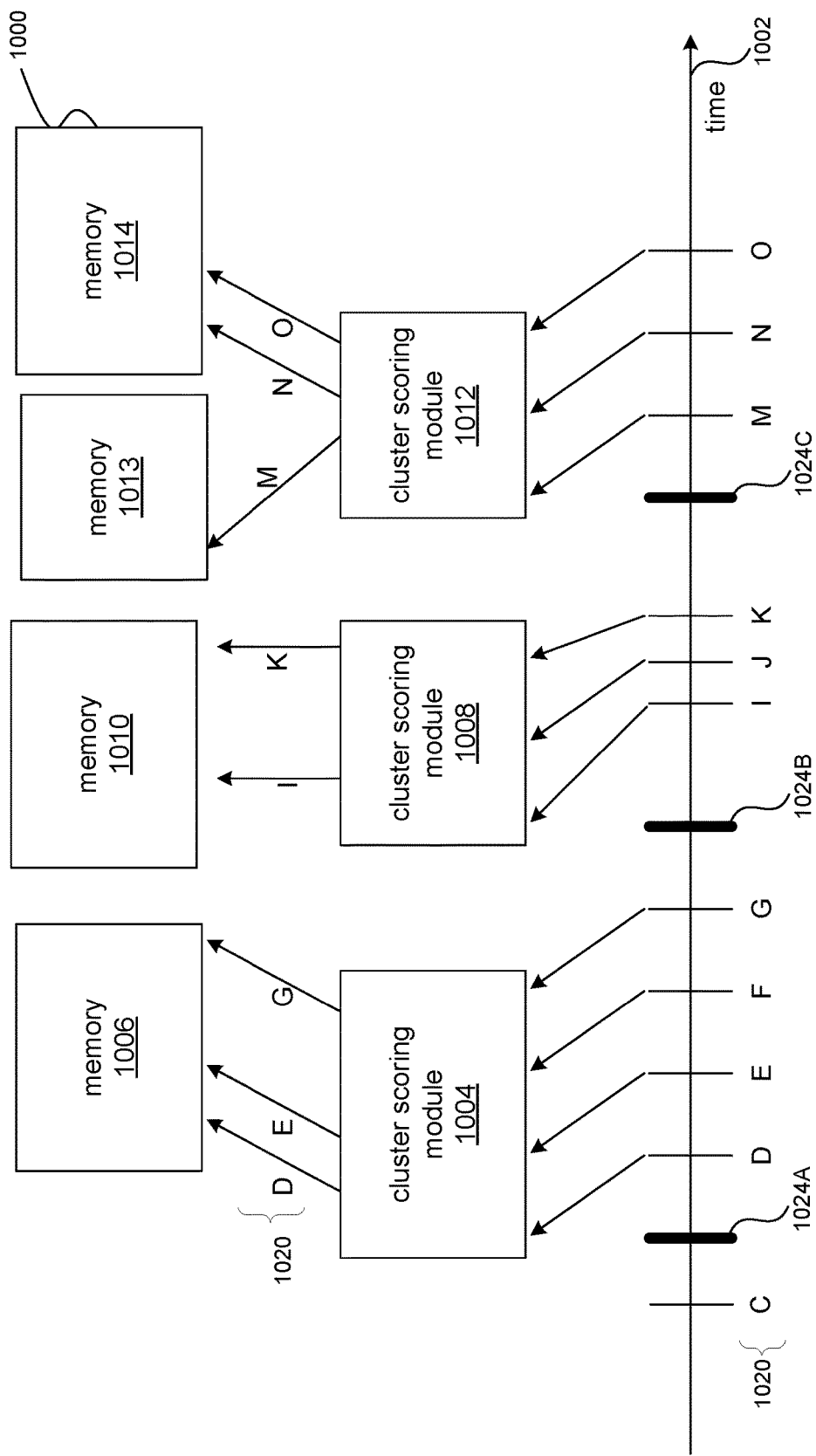
FIG. 10 is a conceptual diagram depicting creating memories from multiple moment content items from a user.

FIG. 10 illustrates process 500 with example 1000 depicting creating memories from multiple moment content items from a user. In this example, moment content items 1020-C, 1020-D, 1020-E, 1020-F, 1020-G, 1020-I, 1020-J, 1020-K, 1020-M, 1020-N, and 1020-O are from a birthday party. Moment content item 1020-C is from driving to the party. Moment content items 1020-D, 1020-E, 1020-F, and 1020-G were from when the guests were singing happy birthday. Moment content item 1020-I, 1020-J, and 1020-K depict cutting the cake. And moment content items 1020-M, 1020-N, and 1020-O depict opening presents.

Moment content items 1020-C, 1020-D, 1020-E, 1020-F, 1020-G, 1020-I, 1020-J, 1020-K, 1020-M, 1020-N, and 1020-O have been tagged (e.g., tagged with semantic identifiers based on person/face recognition, timestamps, object detection, geolocation data, text recognition, speech recognition or transcription, emotion detection, quality detection, activity detection, etc.) and are arranged chronologically on the timeline 1002. Dividers 1024A-C illustrate gaps between the moment content items that are above the threshold amount of time for condition 1) (e.g., the time gap between 1020-C and 1020-D is too large for these moment content items to be in the same memory.

Moment content items 1020-D, 1020-E, 1020-F, and 1020-G which are within the grouping time threshold of each other are inputted into cluster scoring module 1004 (each of the cluster scoring modules 1004, 1008, and 1012 can be an instantiation of the same cluster scoring function that takes a set of moment content items and produces a match score). Cluster scoring module 1004 determines a score indicating whether to cluster moment content items 1020-D, 1020-E, 1020-F, and 1020-G, based on the tags assigned to these moment content items. In this example, this group score from cluster scoring module 1004 is above a threshold, and thus moment content item 1020-D, 1020-E, 1020-F, and 1020-G can be clustered into memory 1006. However, moment content item 1020-F depicts a moment when the camera looked away from the activity of signing happy birthday, and is thus determined to be less relevant and thus moment content item 1020-F is excluded from memory 1006. Moment content items 1020-D, 1020-E, and 1020-G are thus clustered into a "signing happy birthday" memory 1006.

Moment content items 1020-I, 1020-J, and 1020-K are within the grouping time threshold of each other and are inputted into cluster scoring module 1008. Cluster scoring module 1008 determines whether to cluster moment content items 1020-I, 1020-J, and 1020-K based on the tags assigned to the moment content items and computes a group score based on determining whether the match values of each moment content item 1020-I, 1020-J, and 1020-K are above a group score threshold. In this case, the match score of content items 1020-I, 1020-J, and 1020-K is below the threshold but the match score for content items 1020-I and 1020-K are above the threshold while I and K are still within the threshold time of each other. Cluster scoring module 1008 thus creates memory 1010 with moment content items 1020-I and 1020-K. Cluster scoring module 1008 may also create another memory (not shown) for remaining moment content item 1020-J.

Moment content items 1020-M, 1020-N, and 1020-O which are within the grouping time threshold of each other and are inputted into cluster scoring module 1012. Cluster scoring module 1012 determines only the cluster of moment content items 1020-N are 1020-O have a match score above the threshold and thus clusters these moment content items into memory 1014. Remaining moment content item is used to create memory 1013.

Figure 6:
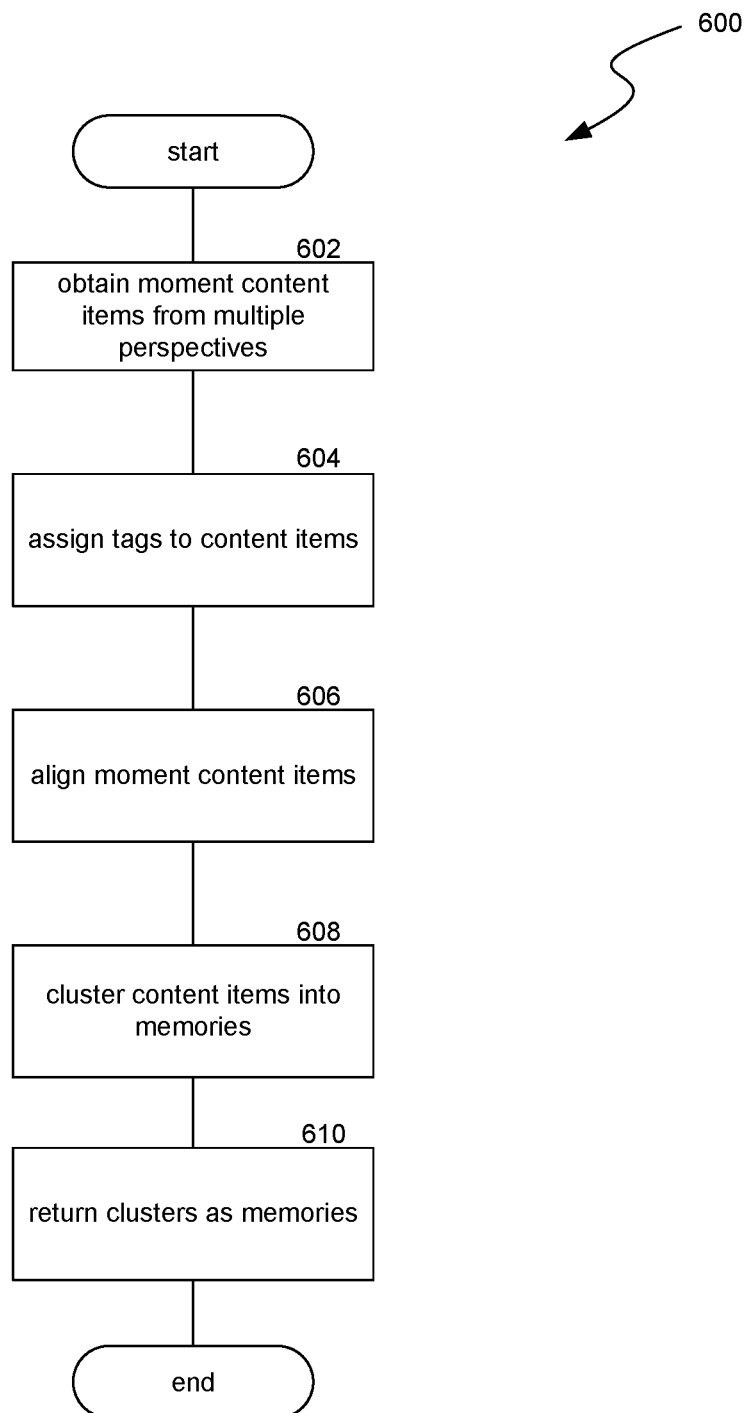
FIG. 6 is a flow diagram illustrating a process used in some implementations of the present technology for creating a memory from multiple moment content items captured by different users or devices.

FIG. 6 is a flow diagram illustrating a process 600 used in some implementations of the present technology for creating a memory from multiple moment content items captured by different users. In some implementations, process 600 can be performed automatically as users provide inputs, such as images, instant messages, video chats, emails, texts, or other digital conversations or recording systems. In some implementations, process 600 can be performed in response to a user action e.g., when a user adds a new content item to a repository or periodically, e.g., by organizing a user's content items into memories on a nightly basis, when there is server processing availability etc. In some cases, process 600 can be performed on a user's local device (e.g., by a phone, XR device, or automated assistant device). In some implementations, process 600 can be performed by a server-side system that is facilitating gathering content items or command data from a local system.

At block 602, process 600 can obtain moment content items from sources associated with multiple users. Obtaining moment content items from multiple users allows for multiple perspectives of the same moment. The users with which the obtained content items are associated can be users with a defined relationship to the primary user for whom memories are being generated. For example, content items can be obtained for users who have a particular relationship with the primary user on a social graph (e.g., are "friends" or "friends of friends"), users identified as being within a geographical distance of the primary user at various times, or users identified as being depicted in a threshold amount of the moment content items of the primary user. Process 600 can obtain these moment content items from sources such as content items posted to a social media site, content items on a user device, content items in a cloud drive, content items content items the user is allowed to access, content items shared with the user, content items posed to a social media platform that privacy settings of the platform allow the user to access (such as friend's accounts, group accounts), etc. The moment content items can be images, video, audio, received or sent messages, instant messages, posts, texts or emails, video chats, message threads, etc. In some cases, the moment content items may include AR or VR effects added to the original content items.

Moment content items may be divided into multiple content items when the content items span more than one instant (e.g., non-images). For example, decomposing a video into frames or 1-second (or any time length) clips or decomposing audio into audio segments of 1-second (or any time length) clips. The moment content items can come from user designated sources (e.g., content items posted to a social media site, content items on a user device, content items in a cloud drive, etc.).

Process 600 can obtain all the content items in the user designated sources or filter the content items before obtaining the content items. Process 600 can filter and select the content items based on a time threshold (e.g., only use content items from the past day, week, month, year, etc.) or based on a window of time (e.g., 7 AM to 9 PM). Process 600 can filter and select the content items based on a quality threshold (e.g., exclude content items below a threshold quality, such as images identified as blurry or with below 500 pixels/sq. inch). Process 600 can filter and select the content items based on similarities in content items (e.g., only select one content item from a group of content items that are similar such as, where there are 5 nearly identical pictures, select the one with the highest quality score). Process 600 can identify duplicate content items using person/facial recognition, object detection, timestamps, text recognition, speech recognition and transcription, location detection or activity detection, and select one of the duplicate content items based on quality, user perspective, or capture angle. In some cases, process 600 can link non-selected content items with the selected one so the user can see the alternate versions (e.g., views captured from other perspectives) when later browsing through a memory. In some cases, each time a new content item is captured, process 600 analyzes it to either assign it to an existing memory or to start a new memory.

At block 604, process 600 can assign tags to the moment content items in a manner similar to block 504 of FIG. 5.

At block 606, process 600 can align the moment content items based on time and/or alignment categories such as location, identified people, identified animals, identified objects, the social graph connection, or AI labels (tags). In some cases, the alignment categories are based on the tags assigned at block 604. In some implementations, process 600 can align the moment content items based on multiple categories and can assign a weight to the categories to determine how the content items align. For example, a time and location overlap between two moment content items can be weighted more heavily in the alignment than the same people or objects being shown in the two moment content items. In some cases, process 600 can identify multiple perspectives in moment content items based on the same category (e.g., time) and use other categories (e.g., location or activity) to align the moment content items. For example, a first and a second moment content item overlap based on time and location, such as at a birthday party at 6 PM, however process 600 can determine to exclude the first moment content item based on the activity category (e.g., the first moment content item is of two parents talking in one room while the second moment content item is a simultaneous cutting of the birthday cake in another room.

At block 608, process 600 can cluster the moment content items into memory content items (e.g., memories) in a manner similar to block 508 of FIG. 5. At block 610, process 600 can provide the memory content items made up of clustered moment content items to the automated memory creation and retrieval system, e.g., for adding to a memory hierarchy and/or memory graph as discussed below and/or for direct user browsing.

Figure 11:
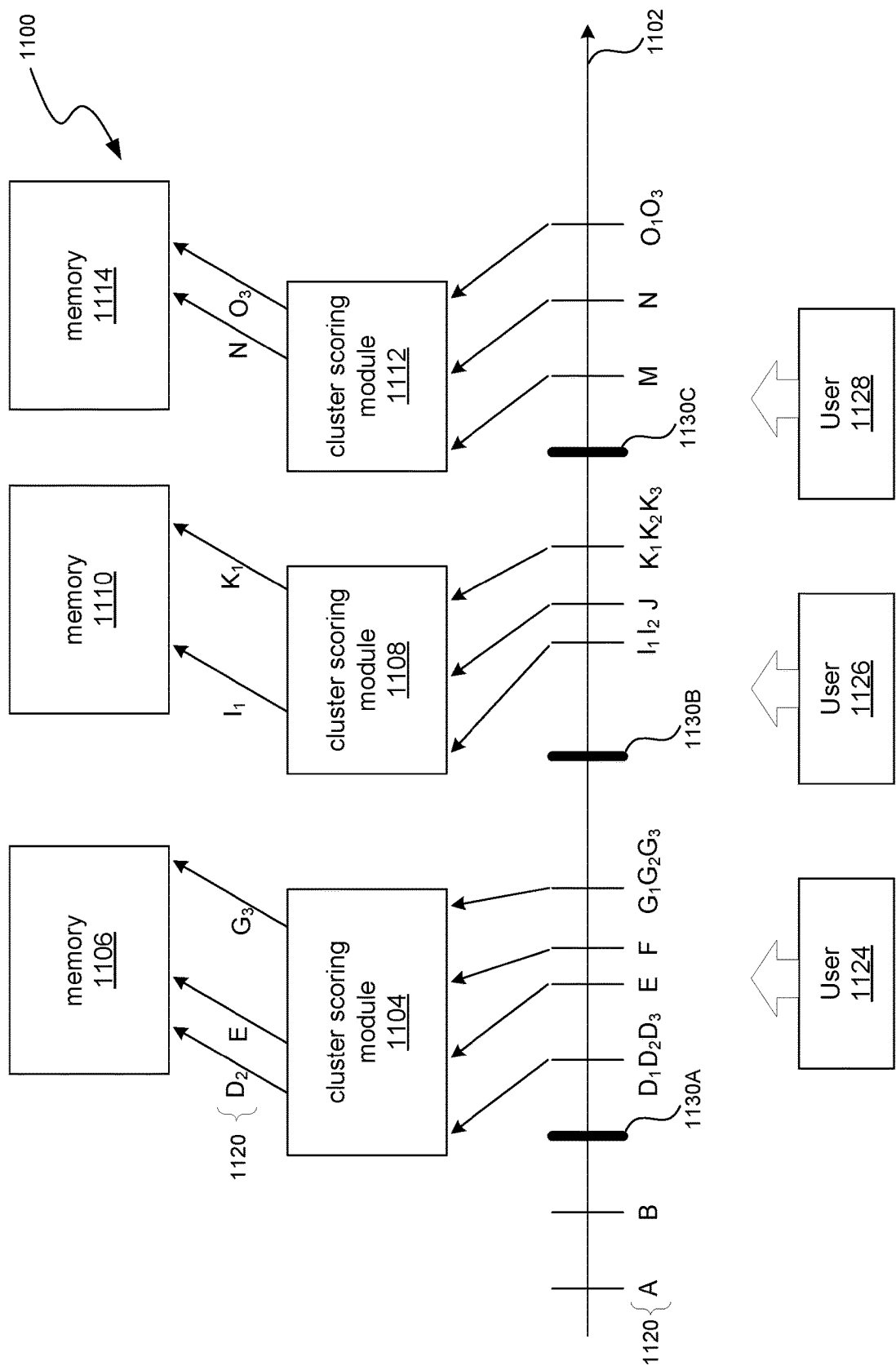
FIG. 11 is a conceptual diagram depicting the creation of memories from multiple moment content items captured by different users.

FIG. 11 illustrates process 600 with example 1100 depicting creating memories from multiple moment content items captured by different users. Moment content items are gathered in relation to user 1124 (the primary user for whom the memories are being generated) and users 1126 and 1128 (who are "friends" of user 1124 on a social graph and were determined to be within a threshold distance of the user 1124 when the user 1124 was capturing some content items. In example 1100, moment content items 1120-A, 1120-B, 1120-D$_1$, 1120-D$_2$, 1120-D$_3$, 1120-E, 1120-F, 1120-G$_1$, 1120-G$_2$, 1120-G$_3$, 1120-I$_1$, 1120-I$_2$, 1120-J, 1120-K$_1$, 1120-K$_2$, 1120-K$_3$, 1120-M, 1120-N, 1120-O$_1$, and 1120-O$_3$ are acquired in relation to users 1126, 1124, and 1126. Moment content items 1120-D$_1$, 1120-D$_2$, 1120-D$_3$, 1120-G$_1$, 1120-G$_2$, 1120-G$_3$, 1120-K$_1$, 1120-K$_2$, 1120-K$_3$, 1120-O$_1$, and 1120-O$_3$ illustrate overlapping moment content items (e.g., in time and location) from the multiple users.

The moment content items have been tagged (e.g., tagged with semantic identifiers based on person/face recognition, timestamps, object detection, geolocation data, text recognition, speech recognition or transcription, emotion detection, quality detection, activity detection, etc.) and are arranged on the line 1102 according to their time and other alignment categories (e.g., location, people, activities, etc.) Dividers 1130A-C illustrate gaps between the moment content items that are above the threshold amount of time for condition 1) (e.g., the time gap between 1020-B and 1020-D is too large for these moment content items to be in the same memory.

Moment content items 1120-D$_1$, 1120-D$_2$, 1120-D$_3$, 1120-E, 1120-F, 1120-G$_1$, 1120-G$_2$, and 1120-G$_3$ which are within the grouping time threshold of each other and/or are aligned based on alignment categories (e.g., location, identified people, identified animals, identified objects, the social graph connection, or AI labels (tags)) are inputted into cluster scoring module 1104 (each of the cluster scoring modules 1104, 1108, and 1112 can be an instantiation of the same cluster scoring function that takes a set of moment content items and produces a match score). Cluster scoring module 1104 determines which of these moment content items to cluster to conform to the two clustering conditions (all clustered content items being within a threshold time of another of the content items in that cluster and the cluster having a match score above a threshold). In some implementations where content items overlap, the cluster scoring module can select only one moment content items from the overlapping set, e.g., the content item with the highest quality or only ones that depict the primary user. For example, from the overlapping content items 1120-D$_1$, 1120-D$_2$, and 1120-D$_3$ the cluster scoring module selects only 1120-D$_2$ the memory determined to have the highest quality and from the overlapping content items 1120-G$_1$, 1120-G$_2$, and 1120-G$_3$ the cluster scoring module selects only 1120-G$_3$, the memory determined to depict the primary user. Based on the clustering conditions, cluster scoring module determines that the largest cluster that can be formed from moment content items 1120-D$_2$, 1120-E, 1120-F, and 1120-

G, while satisfying the clustering conditions are the content items 1120-D$_2$, 1120-E, and 1120-G$_3$, which are clustered into memory 1106.

Similarly, from moment content items 1120-I1 and 1120-I2, clustering module has selected content item 1120-I1 and from moment content items 1120-K1, 1120-K2, and 1120-K3 clustering module has selected content item 1120-K1. Based on the clustering conditions, cluster scoring module determines that the largest cluster that can be formed from moment content items 1120-I1, 1120-J, and 1120-K1, while satisfying the clustering conditions are the content items 1120-I1 and 1120-K1, which are clustered into memory 1110. A similar process is performed to analyze moment content items 1120-M, 1120-N, 1120-O1 and 1120-O2 and create memory 1114.

Figure 7:
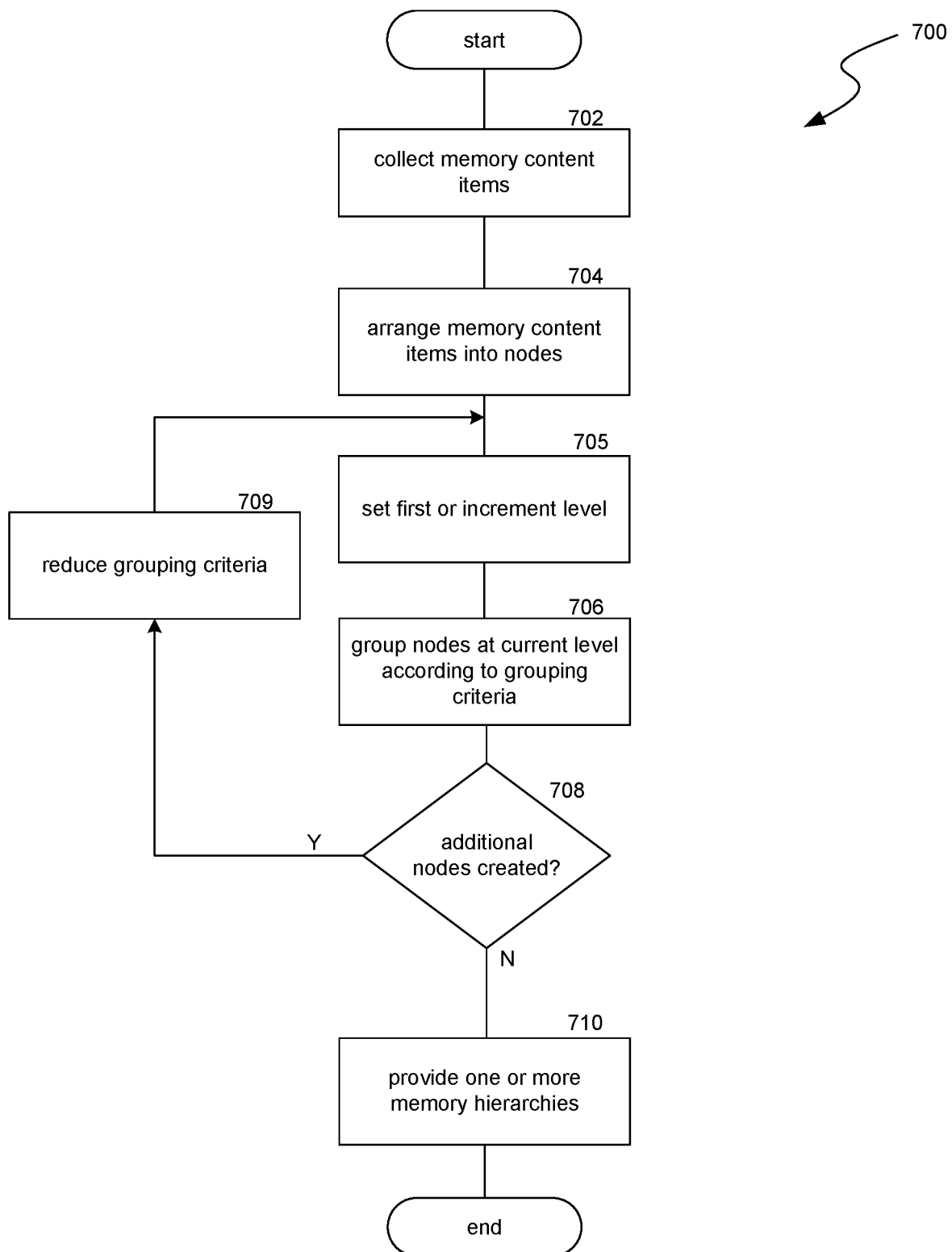
FIG. 7 is a flow diagram illustrating a process used in some implementations of the present technology for organizing multiple memories into a memory hierarchy.

FIG. 7 is a flow diagram illustrating a process 700 used in some implementations of the present technology for organizing multiple memories into a hierarchy. In some implementations, process 700 can be performed in response to the completion of process 500 or 600, e.g., as new memories are formed they can then be put into a hierarchy. In other cases, process 700 can be performed periodically, e.g., nightly or weekly. In some implementations, process 700 can be performed by a server-side system that is facilitating memory creation and provisioning for a local system. In other implementations, process 700 can be performed on a client, e.g., a client that is generating the hierarchy data structure as a precursor to locally providing memories to a user.

At block 702, process 700 can collect the memory content items (e.g., from process 500 of FIG. 5 and/or process 600 of FIG. 6). The memory content items each include one or more moment content items that are tagged with semantic identifiers. At block 704, process 700 can arrange the memory content items into an ordered set of leaf nodes. The ordered set of leaf nodes can be the first level (e.g., base level) in the memory hierarchy. Process 700 can arrange the memory content items chronologically (e.g., based on the timestamps assigned to the moment content items that are clustered into that memory).

At block 705 process 700 can set a current level. If this is the first iteration of the loop between block 705-709, the current level can be the leaf node level created at block 704. Otherwise the current level is incremented to be one level higher than the previous iteration of this loop.

At block 706, process 700 can group nodes at current level according to grouping criteria. At the current level in the hierarchy, process 700 can create a new combination node (a higher-level or higher-order node) from sets of adjacent nodes in the hierarchy when the grouping criteria is met. Each node that is grouped into the higher order node can set that higher order node as its parent node in the hierarchy. In some implementations, the grouping criteria can be an amount of features, between the semantic tags on the memories, that must match for the memories to be grouped into a higher-order node. Thus, Process 700 can identify sets of sibling nodes that share a threshold amount of the semantic identifiers based on the tags assigned to the memory content items. For example, the groupings can be based on tags assigned to the memories, such as the people depicted in a memory content item, an activity taking place in the memory content item, a location associated with the memory content item, etc. In some implementations, each node can be grouped into no more than one higher order node.

At block 708, process 700 can continue the loop between blocks 705-709 while at least one new node was created in the current iteration of the loop. When no new nodes were created, each of the highest order nodes created can be set as a root node for a corresponding hierarchy. When new nodes have been created, process 700 can continue to block 709 where the grouping criteria can be reduced, such as by reducing the number of features that have to match for two nodes to be grouped. Thus, as process 700 traverses up creating new levels of the hierarchy, less similarity is needed between sibling nodes to combine them. For example, in the leaf level, the nodes must have six or more semantic identifiers in common, but in the second level the nodes only need to have five semantic identifiers in common, and so on. In some implementations, block 709 only reduces the grouping criteria if it has not reached a minimum, such as three matching features.

At block 710, process 700 can provide the one or more memory hierarchies, e.g., for use in selecting memories to surface to a user via a memories application, an XR device, etc., as described below in relation to FIG. 9.

Figure 12:
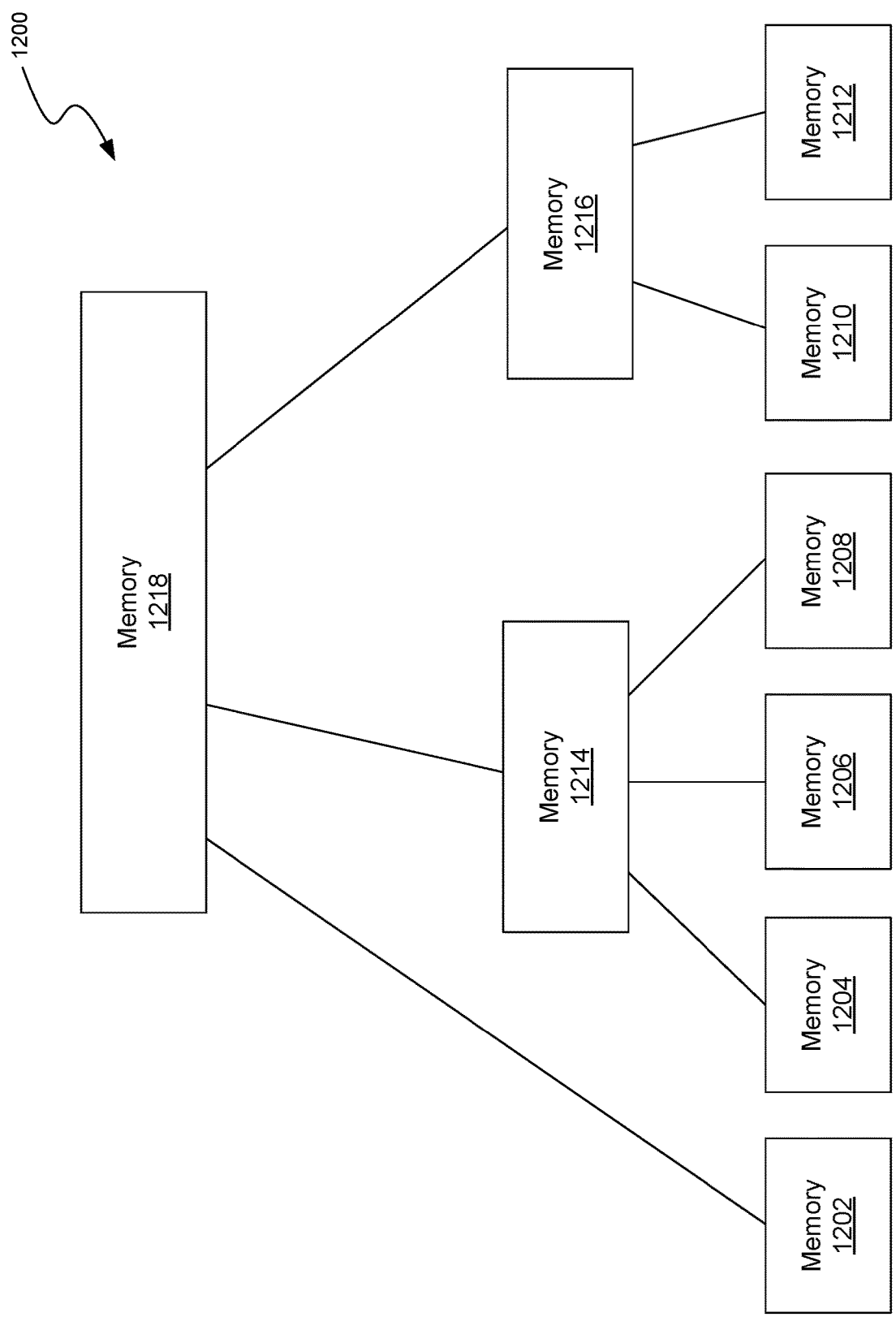
FIG. 12 is a conceptual diagram depicting the organization of multiple memories into a memory hierarchy.

FIG. 12 illustrates process 700 with example 1200 depicting organizing multiple memories into a memory hierarchy. Memory 1202, 1204, 1206, 1208, 1210, and 1212 are arranged into an ordered set of leaf nodes as the first level of the memory hierarchy. Memory 1214 and 1216 illustrate a higher-level nodes and memory 1218 illustrates the root node of the memory hierarchy. Memories 1204, 1206, and 1208 have been identified as a first set of sibling nodes that share a first threshold (five) of semantic identifiers and memories 1210 and 1212 have been identified as a second set of sibling nodes that share the first threshold of semantic identifiers. Thus, memories 1204, 1206, and 1208 are combined into memory combination node 1214 with memories 1204-1208 as it's child nodes. Similarly memories 1210 and 1212 are combined into memory combination node 1216 with memories 1210 and 1212 as it's child nodes. Memory 1202 illustrates a node that does not share the first threshold number of semantic identifiers to memory 1204. Moving up to the next level of the hierarchy, a second threshold (three) of semantic identifies is set. At the second level, nodes not combined in the previous level are considered, and it's determined that memory 1202 and memory combination nodes 1214 and 1216 all share the threshold number of features. Thus, memory 1202 and memory combinations 1214 and 1216 are combined into memory combination node 1218, with these nodes set as the children of combination node 1218. No further combinations can be made and thus the memory hierarchy is complete.

Figure 8:
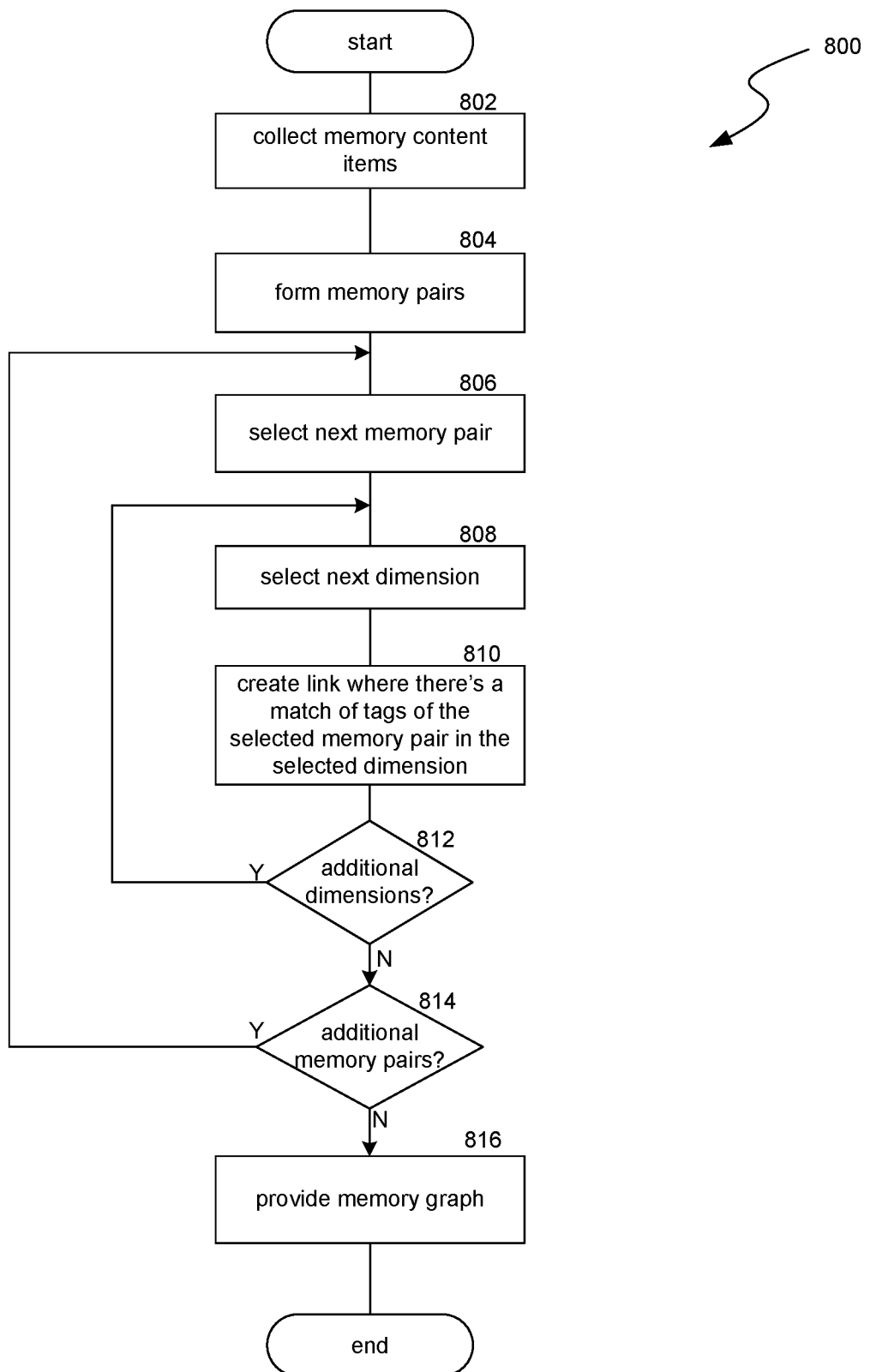
FIG. 8 is a flow diagram illustrating a process used in some implementations of the present technology for graphing links between memories.

FIG. 8 is a flow diagram illustrating a process 800 used in some implementations of the present technology for graphing links between memories. In some implementations, process 800 can be performed in response to the completion of process 500 or 600, e.g., as new memories are formed, they can then be put into a memory graph. In other cases, process 800 can be performed periodically, e.g., nightly or weekly. In some implementations, process 800 can be performed by a server-side system that is facilitating memory creation and provisioning for a local system. In other implementations, process 800 can be performed on a client, e.g., a client that is generating the memory graph data structure as a precursor to locally providing memories to a user.

At block 802, process 800 can collect the memory content items (e.g., from process 500 of FIG. 5 and process 600 of FIG. 6) to generate a memory graph.

At block 804, process 800 can form the memory content items into memory pairs. In some implementations, all possible memory pairs can be created. In other implementations, to avoid the exponential nature of evaluating all possible memory pairs, memory pairs can be formed where memories have a threshold number of similar tags or tag types. For example, process 800 can create memory pairs where two memories have at least two matching tags, where the two memories have tags in at least three of the same dimensions (dimensions are discussed below), or have tags in particular dimensions such as location and people.

At block 806, process 800 can begin an outer loop that iterates through all the memory pairs formed at block 804. Each time process 800 reaches block 806, process 800 selects a next one of the memory pairs for the outer loop to evaluate.

Process 800 can determine associations between memory content items in one or more dimensions. The dimensions can include time, identified people, identified subjects (e.g., depicted objects, text shown, identified speech/sounds (e.g., laughter)), identified location, identified activities, identified emotions, etc. At block 808, process 800 can begin an inner loop that, for the memory pair selected at block 806, iterates through all the dimensions to determine if there should be a link between the memories for the selected dimension. Each time process 800 reaches block 808, process 800 selects a next one of the dimensions in a list of the dimensions, and starts again at the beginning of the list when a new memory pair has been selected.

At block 810, process 800 can compare the tags of the selected memory pair for the selected dimension to determine they have a threshold match level to for a link between the memories, of the selected memory pair, in the selected dimension. If the level of match meets a match threshold, process 800 can add graph edge between the current memory pair for the current dimension. In various implementations, computing a match level and the match threshold can be the same for each dimension or can be different for each dimension. As an example of using different match levels and threshold for the dimensions, for a people dimension the match level can be a count of the number of matching people tags between the two memories and the match threshold can be three, whereas for the location dimension the match level can be a distance between locations specified for the first and second memories and the match threshold can be 500 feet. As an example of using the same match level and/or threshold, the match level can be a match in values between tags specified for the selected dimension and the threshold can be one, thus a match in the location dimension could be whether a "city" identifier for the memories has the same value specified (e.g., "Paris"), whereas a match in the activity dimension can occur where an activity tag for both the memories specifies the same value (e.g., "hiking").

In some implementations, the links (or edges) between the memory pairs can be weighted based on the level of the match. In some cases, the links (or edges) between the memory pairs can also or alternatively be weighted according to (or inversely according to) a relevance of the match to a central concept or concepts for the selected dimension. Central concepts for dimensions, for example, can be for the location dimension, a home and work location of the primary user (the user for whom the memory graph is being created) where the weight relevance is computed according to physical distance to either of these locations; for the people dimension, the central concept can be the primary user where the weight relevance is computed according to a number of hops from the primary user to the tagged users on a social graph; for the activities dimension, the central concepts can be activities determined to be commonly performed by the primary user where the weight relevance is computed according to a distance of embeddings between a tagged activity and the common activity; etc. For example, process 800 can reduce the weight of an edge between two memories in the location dimension when the locations of the memories are determining to be close to the user's house. Thus, links between memories that are unremarkable are weighted lower than links that may be special. For example, a link between two memories that occurred far away from the user's home (e.g., on vacation) may be of more interest to the user than a link between two memories where the user is often (e.g., the local coffee shop where the user goes every day). Some dimensions, such as time, may not have a central concept. In yet further cases, process 800 can assign the edge weights according to how common the tagged features between the two memories are in the user's memories. For example, the frequency of an activity can reduce the weight of the activity in the links between memories. For example, an activity such as commuting to work will be weighted lower than traveling to a vacation destination, since the user traveling to vacation is more unique than commuting to work. Such weights can be set because links between such unique experiences are more likely to be of interest to the user.

At block 812, process 800 returns to block 808 if there are additional dimensions to evaluate for the selected memory pair. If all dimensions have been evaluated for the selected memory pair, process 800 continues to block 814. At block 814, process 800 returns to block 806 if there are additional memory pairs (from the memory pairs formed at block 804) to evaluate. If all the memory pairs have been evaluated, process 800 continues to block 816.

At block 816, process 800 can provide the memory graph, e.g., for use when a user is browsing through memories, such that the links between memories can be used to filter which memories are related to a memory starting point (e.g., a memory selected using the hierarchy described above). Such memory browsing can be done via a memories application, an XR device, etc., as described below in relation to FIG. 9.

Figure 13:
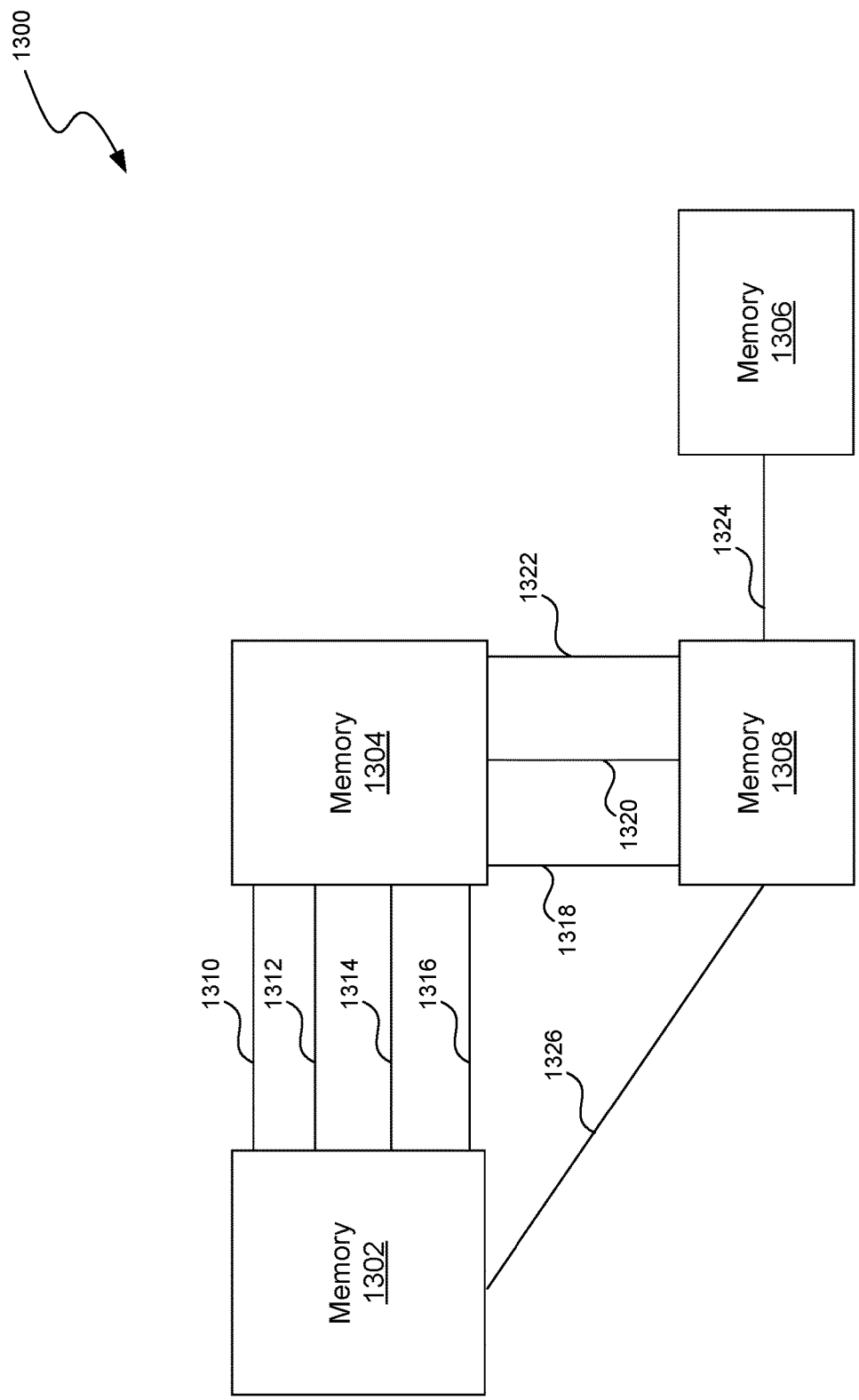
FIG. 13 is a conceptual diagram depicting the graphing of links between memories.

FIG. 13 is a conceptual diagram depicting an example 1300 of process 800 for graphing links between memories. Example 1300 includes memories 1302-1308. In example 1300, all memory pairs are evaluated, thus process 800 iterates through memory pairs 1302:1304, 1302:1306, 1302: 1308, 1304:1306, 1304:1308, and 1306:1308. In this example, the dimensions are location, activities, time, and people. Memories 1302 and 1304 share tags in all these dimensions, and thus have a links 1310-1316 (one for each dimension). Memories 1302 and 1306 share no tags in these dimensions, and thus are not directly linked. Memories 1302 and 1308 share tags in just the time dimension, and thus have link 1326. Memories 1304 and 1308 share tags in the time, people, and location dimensions, and thus have links 1318-1322. Memories 1304 and 1306 share no tags in these dimensions, and thus are not directly linked. Memories 1306 and 1308 share tags in just the people dimension, and thus have link 1324.

Figure 9:
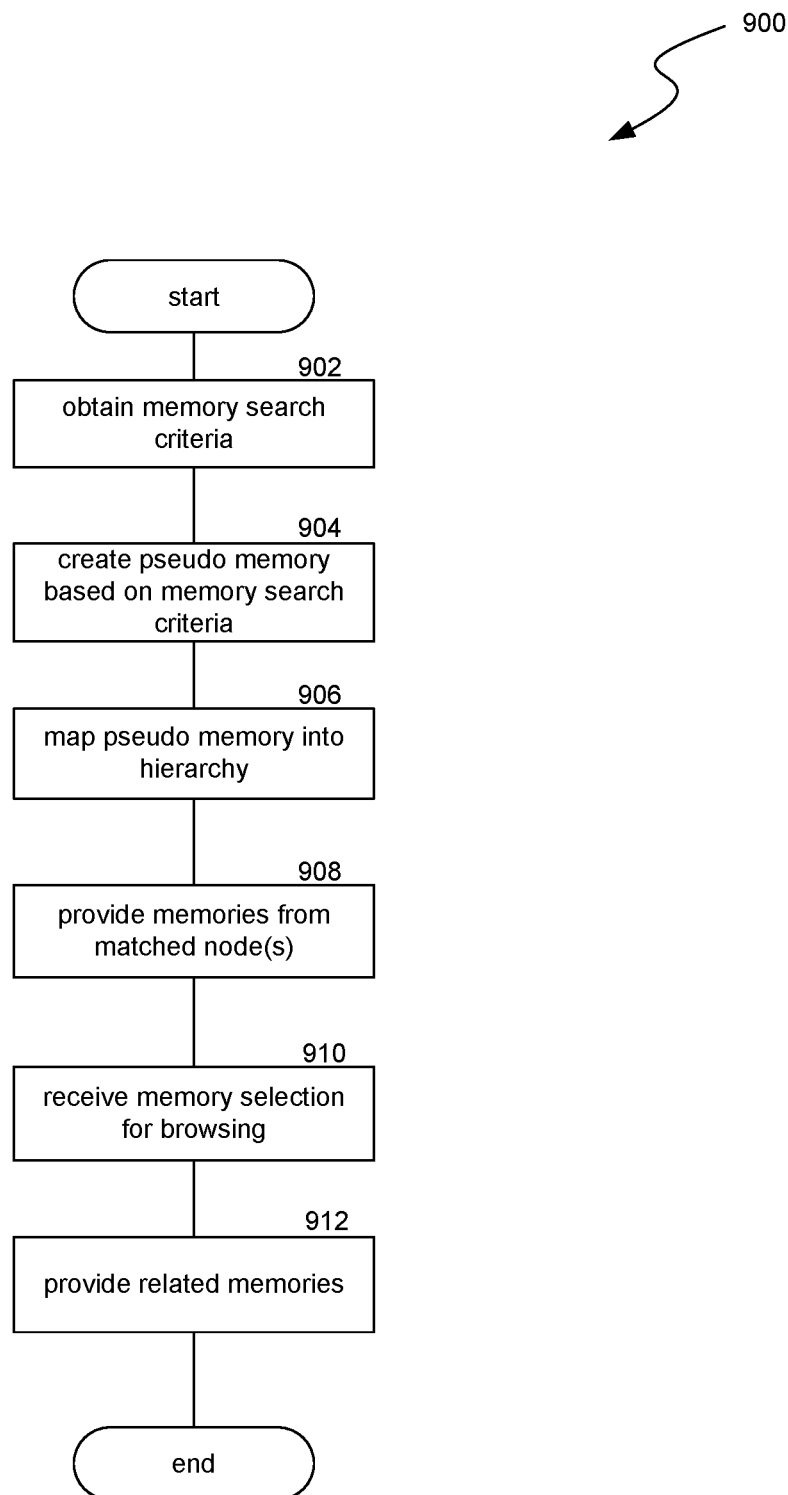
FIG. 9 is a flow diagram illustrating a process used in some implementations of the present technology for providing one or more memories from a memory hierarchy.

FIG. 9 is a flow diagram illustrating a process 900 used in some implementations of the present technology for providing one or more memories (e.g., from a memory hierarchy and/or memory graph). In various implementations, process 900 can be performed in response to execution of a memories application (e.g., an application that surfaces memories to a user). In various implementations, such a memories application can be an app on a user's device (e.g., an app on a mobile phone where a user can search and browse for memories), an add-in to another application (e.g., an applet in a social media or messaging application surfacing memories in relation to social media or messaging activities), or an application on an XR device (e.g., an application that gets a context of the user and/or XR device and surfaces related memories in an XR environment). In some cases, process 900 can be performed on a user's local device (e.g., by a phone, XR device, or automated assistant device). In some implementations, process 900 can be performed by a server-side system that stores and selects memories to surface to a user.

At block 902, process 900 can obtain memory content item search criteria from a user interface (UI). In some cases, the search criteria can include user inputs in searching for memories (e.g., text or voice in a memories app, using a voice assistant, web browser, etc.) and/or a context of the user. The search criteria can include features such as user supplied words, objects, sounds, a selection of other memories (e.g., to find similar memories), etc. to match on. In some implementations, the search criteria can include a context of the user (e.g., gathered by an XR device, mobile device, information from a social graph, etc.), which can include images and recordings of the area and/or identified information such as people detected in the vicinity of the user, objects detected in the vicinity of the user, GPS or other location markers of the user or indicated by the user, determined current activities of the user, emotional state of the user, identified ambient sounds (e.g., laughing, singing, yelling, footsteps, running water, barking, etc.)

At block 904, process 900 can create a pseudo memory based on the memory search criteria. Process 900 can create the pseudo memory as a memory data structure with the search criteria as the semantic tags for the pseudo memory. For example, if the user enters a search query as "kayaking in Hawaii," process 900 can create a pseudo memory with the tags of location (Hawaii) and activity (kayaking). As another example, where images and other contextual information, gathered by an XR device, are used to create the pseudo memory, the pseudo memory can have tag corresponding to identifying that the user is near her sister, is riding a motorcycle, there are ambient engine sounds, and the Golden Gate Bridge is in view.

At block 906, process 900 can map the pseudo memory into the memory hierarchy (e.g., using process 700 of FIG. 7) to determine which nodes in the memory hierarchy the pseudo memory would be grouped into. Process 900 can map the pseudo memory into the memory hierarchy by determining nodes, of the memory hierarchy, with which the pseudo memory can be grouped according to the grouping criteria (see block 706). Process 900 may use relaxed grouping criteria when employing process 700 such that the pseudo memory can map to nodes using a lower grouping criteria at block 706 then was used to originally create the memory hierarchy with non-pseudo memories. In some cases, the pseudo memory may not include a time component and the pseudo memory can be mapped into the memory hierarch regardless of time by comparing the pseudo memory with each second and higher level node in the hierarchy according to the grouping criteria. In some cases, the pseudo memory may be mapped to more than one node of a hierarchy, and process 900 can select a node that is at a specified level, such as a lowest non-leaf level of the hierarchy, a third level of the hierarchy, etc. In some implementations, process 900 can select multiple nodes. For example, if the user searches for a memory of kayaking during spring break in Hawaii, creating a pseudo memory with these tags, process 900 can return memory nodes with tags of kayaking in Hawaii, of spring break in Hawaii, and of kayaking during spring break in Hawaii based on comparisons of the pseudo memory tags with the hierarchy nodes according to the reduced match criteria.

At block 908, process 900 can provide, via a user interface, one or more memory content items corresponding to the node(s) of the memory hierarchy selected at block 906. In various implementations, the memories of a selected node can be displayed on a computing screen (e.g., in a memories application, in a social media application, in a browser interface, etc.) or by a XR device (e.g., as virtual objects linked to elements in the world matching the memory tags). The selected memories can be provided in various configurations such in search results (e.g., in a grid or list with thumbnails for the memories), in association with a conversation in which the user is partaking, as suggestions to post to a social media site, as virtual objects in an artificial reality environment, etc. In some cases, the memory can be displayed in a manner that indicates related memories in the memory hierarchy and/or the memory graph, allowing the user to browse through these related memories, as discussed below. Examples of surfacing and browsing memories are also provided below in relation to FIGS. 14-16.

At block 910, process 900 can receive, from the user interface, a selection of the one or more provided memory content items. The selected memory can be displayed, allowing the user to view the moment content items encapsulated in the memory. For example, the user can view pictures, videos, audio recordings, etc. of the memory. In some cases, the user can select alternate views of various moments in the memory content items. In addition to viewing the selected memory, the selection can be used as a starting point to browse through related memories in the memory hierarchy and/or memory graph. In some cases, the user can provide additional search criteria for the process 900 to update the search (which can re-execute process 900 with the selected memory as a context), or filter items in the memory hierarchy or memory graph when browsing.

At block 912, process 900 can provide memory content items based on the user's selections of the provided memory content items (and any additional search criteria or filtering selections). Process 900 can provide related memories based on relationship in the memory hierarchy and/or graph to the selected memory. The related memories can be from parent or child nodes of the selected memory in the hierarchy (e.g., within a threshold number of levels). For example, process 900 can retrieve memories from the hierarchy in the parent or child nodes of the node from which the user-selected memory was drawn (at block 906). The related memories can also be the memories conned to the user-selected memory in the memory graph. For example, memories connected to the user-selected memory in any dimension, in dimensions corresponding to the user search criteria, and/or in dimensions corresponding to the user-selected filters can be provided to the user. In some cases, where the edges in the memory graph have weights, memories can be retrieved where an edge has above a threshold weight or where the combination (e.g., sum or average) of all edge weights or edge weights for edges corresponding to user search or filter criteria is above a threshold. Process 900 can present the returned memories on the UI indicating the relationship between memories (e.g., showing types of connections from the graph or whether the memory is a more general memory set from the hierarchy (i.e., a parent node) or more specific memories (i.e., a child node). The UI may also have controls to filter results on these factors (e.g., a slider bar to filter for more/less specific memories and/or connection type selectors. In some implementations, the memory can be provided as a hologram or other virtual object in an artificial reality environment. For example, the memory can be displayed in relation to a real-world object or context that triggered retrieval of the memory. In some implementations, 2D memories (e.g., videos, pictures, etc.) can be converted to 3D objects, e.g., by applying machine learning algorithms that estimate depth data for images, so the memories can be shown in a more lifelike manner. In some cases, the moment content items that make up the memory can have been captured as 3D objects (e.g., capturing RGB and point cloud or other depth data), and thus can be played back as 3D objects.

As process 900 returns the related memories, process 900 can return to block 910, allowing the user to further select from the related memories to continue browsing through memories via the memory hierarchy and/or memory graph. Examples of browsing through the memory hierarchy and memory graph are provided below in relation to FIGS. 14-16.

Figure 14A:
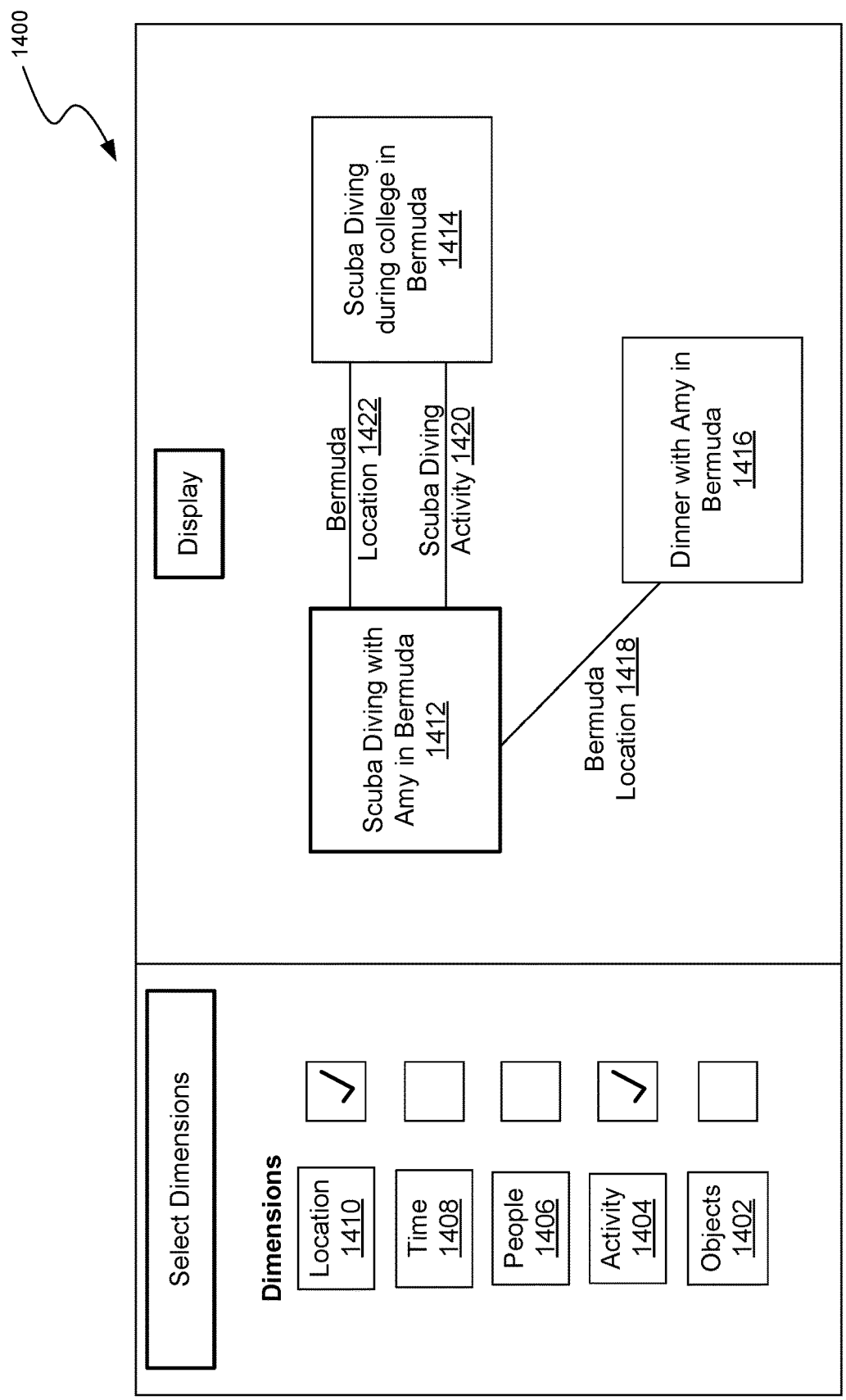
FIGS. 14A and 14B are conceptual diagrams depicting using a memory graph with links between memories, in various dimensions, to browse memories.
Figure 14B:
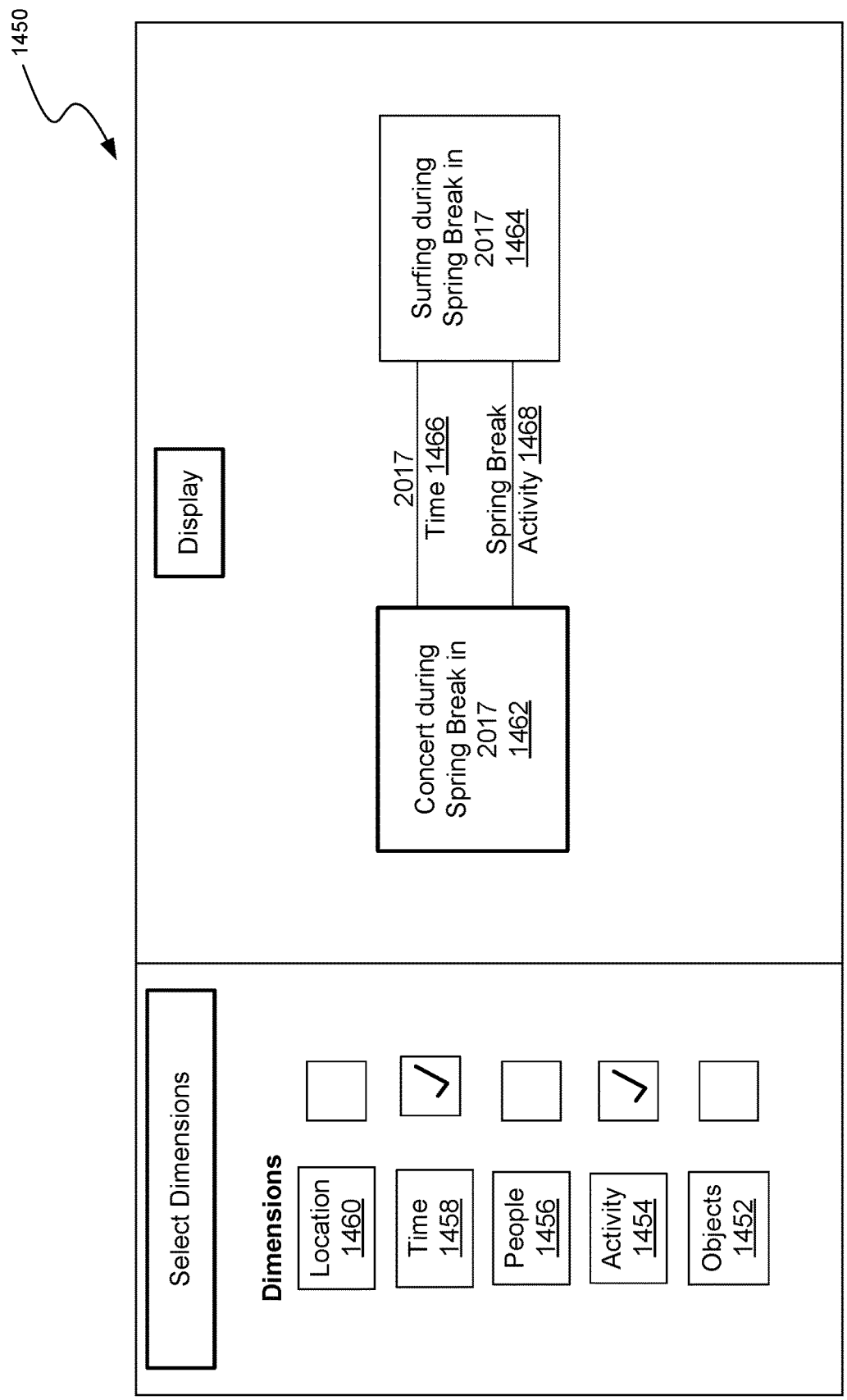

FIGS. 14A and 14B are conceptual diagrams depicting using a memory graph with links between memories, in various dimensions, to browse memories. FIG. 14A illustrates example 1400 depicting memories linked together in multiple dimensions. Memory 1412 (scuba diving with Amy in Bermuda) is outlined in bold to illustrate that this was a returned memory that was selected by a user. Memory 1412 is connected, in a memory graph to a number of memories including memories 1414 and 1416. Example 1400 includes a number of controls allowing a user to select dimensions (from dimensions objects 1402, activities 1404, people 1406, time 1408, and location 1410) with which the user would like to browse from a selected memory. In example 1400, the user has selected dimensions location 1410 and activity 1404, indicating the system should show memories that are linked to the selected memory by having a matching location or a matching time frame. In example 1400, the filters are used as an "OR" condition, showing memories linked to the selected memory in any of the selected dimensions. In other cases (such as in example 1450) filters can have an "AND" condition, showing only the memories that are linked to the selected memory in all of the selected dimensions. In various implementations, whether the filters have an OR or AND condition can be set for the system or user selected.

In example 1400, memory 1414 is for scuba diving during college in Bermuda, with link 1422 to the selected memory 1412 due to being in the same location (Bermuda) and link 1420 to the selected memory 1412 due to depicting the same activity (scuba diving). Further, memory 1416 is for dinner with Amy in Bermuda, with link 1418 to the selected memory 1412 due to being in the same location (Bermuda). Thus, the memories 1412 (scuba diving with Amy in Bermuda) and 1414 (scuba diving during college in Bermuda) are returned as linked to the selected memory. The user could further select one of these memories to browse additional memories.

FIG. 14B illustrates example 1450, also depicting memories linked together in multiple dimensions. Following a user search that returned memories for concerts, the user selected memory 1462 (concert during spring break in 2017), as illustrated by memory 1462 having a bold border. Similarly to example 1400, example 1450 includes several controls allowing a user to select dimensions (from dimensions objects 1452, activities 1454, people 1456, time 1458, and location 1460) with which the user would like to browse from a selected memory. Memory 1462 is connected, in a memory graph to a number of memories including memory 1464. In example 1450, the user has selected dimensions time 1458 and activity 1454, indicating the system should show memories that are linked to the selected memory by having a matching time frame and a matching activity. In example 1450, the filters have an "AND" condition, showing only the memories that are linked to the selected memory in all of the selected dimensions.

In example 1450, memory 1462 is for a concert during spring break in 2017 and memory is for surfing during spring break in 2017, and thus these memories are linked with link 1466 due to being in the same time frame (2017) and are linked with link 1468 due to having a matching activity (spring break). Thus, the memory 1464 is returned as linked to the selected memory in the indicated dimensions. The user could further select this memory to browse additional memories.

Figure 15:
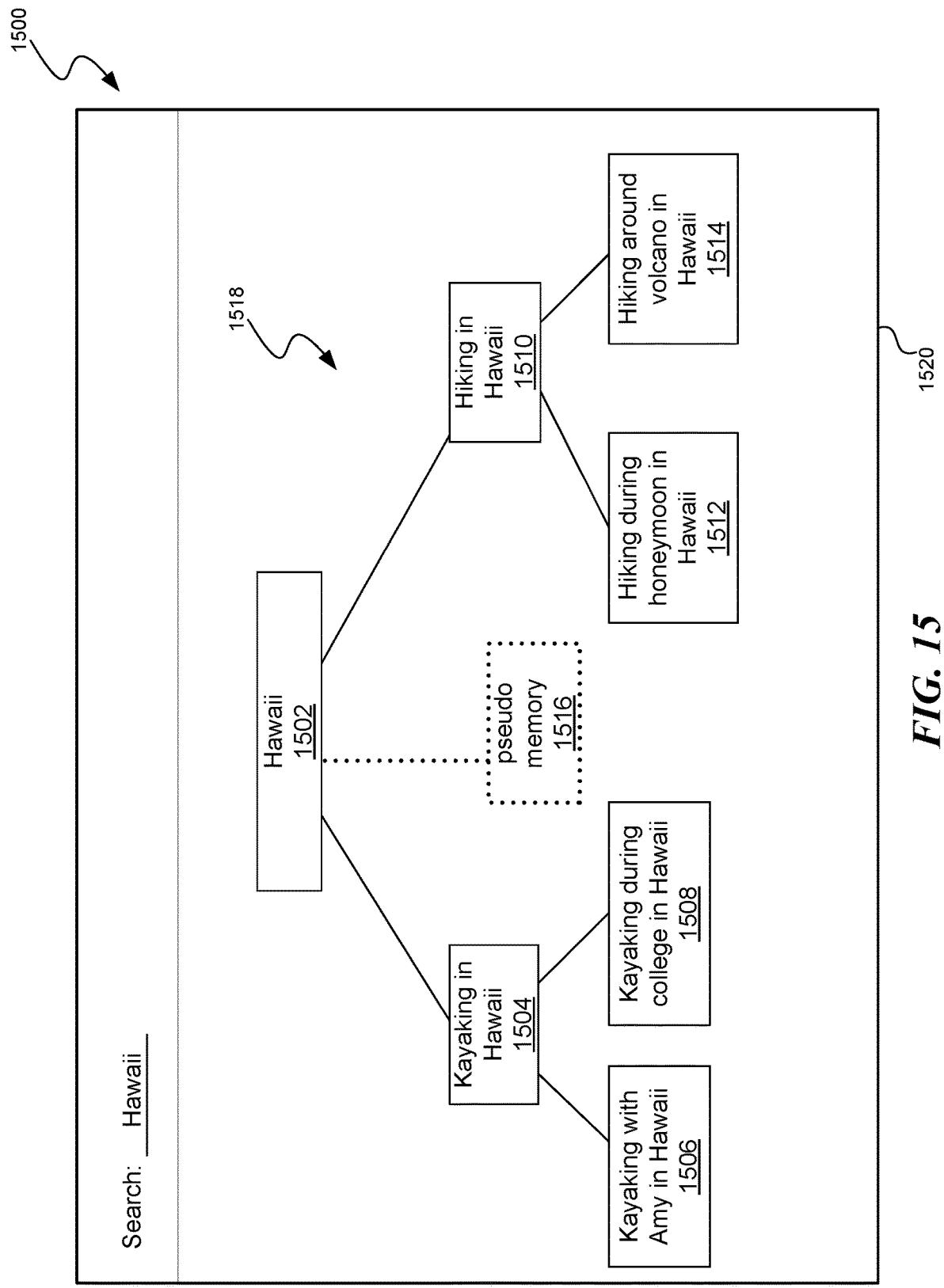
FIG. 15 is a conceptual diagram depicting browsing memories via a memory hierarchy and based on user search criteria.

FIG. 15 is a conceptual diagram depicting an example 1500 of browsing memories via a memory hierarchy and based on user search criteria. In example 1500, the user has supplied a search criterion of "Hawaii." Based on this search criteria, pseudo memory 1516 has been created. Pseudo memory 1516 is then mapped into a memory hierarchy (not shown) where a portion 1518 that the pseudo memory matches is returned and displayed to a user via user interface 1520. For example, the pseudo memory can have the tag "location: Hawaii" and the grouping criteria for mapping the pseudo memory into the hierarch could be at least two matching tags for a match at the second level (containing nodes 1504 and 1510) and at least one matching tag for a match at the third level (containing node 1502). Thus, the pseudo memory matches the node 1502 that has the same "location: Hawaii" tag. In example 1500, the results are displayed showing a matching node and any nodes in two levels below the matching node, thus nodes 1502, 1504, 1506, 1508, 1510, 1512, and 1514 are displayed in the user interface. The user can select any of these memories to view the memory or to see which other memory nodes that selected memory is liked to in the hierarchy, thus allowing the user to browse memories in the memory hierarchy.

Figure 16:
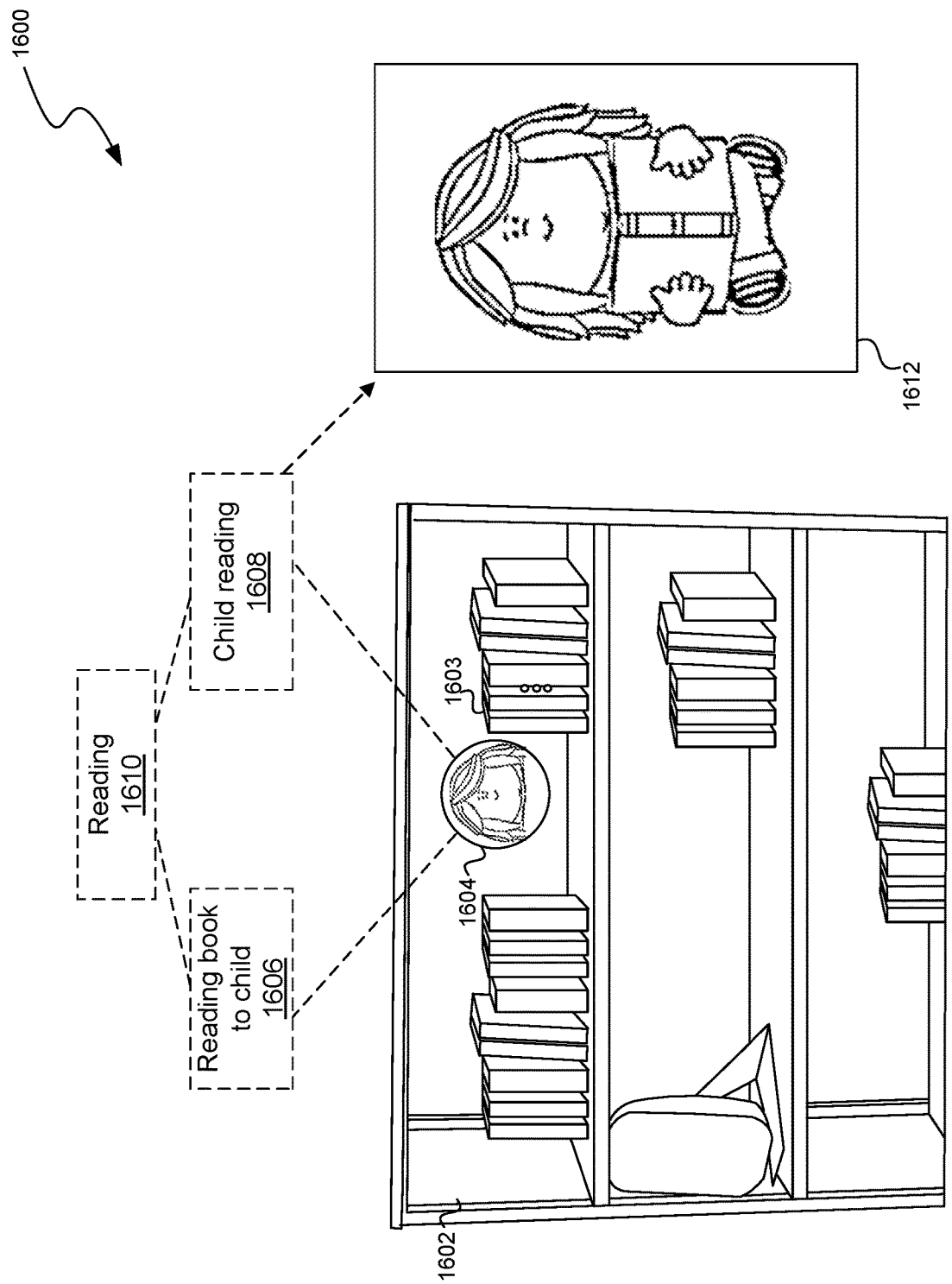
FIG. 16 is a conceptual diagram depicting an example of an artificial reality glint which displays a memory hierarchy.

FIG. 16 illustrates example 1600 depicting an artificial reality glint which displays a memory hierarchy. In some implementations, memories can be surfaced to the user as glints in an artificial reality environment via an XR device. A "glint" can be a visual icon with an appearance based on the memory where a user can interact with the glint to open the full memory item or browse other memories. Some additional examples of displaying glint virtual objects that can be selected or customized using the disclosed technology are described in U.S. patent application Ser. No. 16/950, 823, titled ARTIFICIAL REALITY ENVIRONMENT WITH GLINTS DISPLAYED BY AN EXTRA REALITY DEVICE, which is herein incorporated by reference in its entirety. In example 1600, a current context of the user is used to create a pseudo memory with tags based on a location (near a bookshelf 1602 in the user's home) and identified objects (books 1603). This pseudo memory is mapped into a memory hierarchy (as discussed above) and a portion of the hierarchy containing nodes 1606, 1608, and 1610 is returned. Further, a glint 1604 representing the set of memories in the hierarchy is created and attached to the context objects—books 1603. When the user interacts with the glint 1604 via the XR device (e.g., by performing an air-tap on the glint 1604), the memory hierarchy is displayed allowing the user to further select an individual node. In some cases, instead of displaying the hierarchy, the glint represents a single selected memory, which can be displayed to the user when the glint is acted upon. In example 1600, the displayed hierarchy includes the memory 1606 of the user reading a book to her child and memory 1608 of her child reading and the set of memories 1610 related to reading. When the user further selects memory 1608, that memory is displayed at 1612 in the artificial reality environment.

Figure 17:
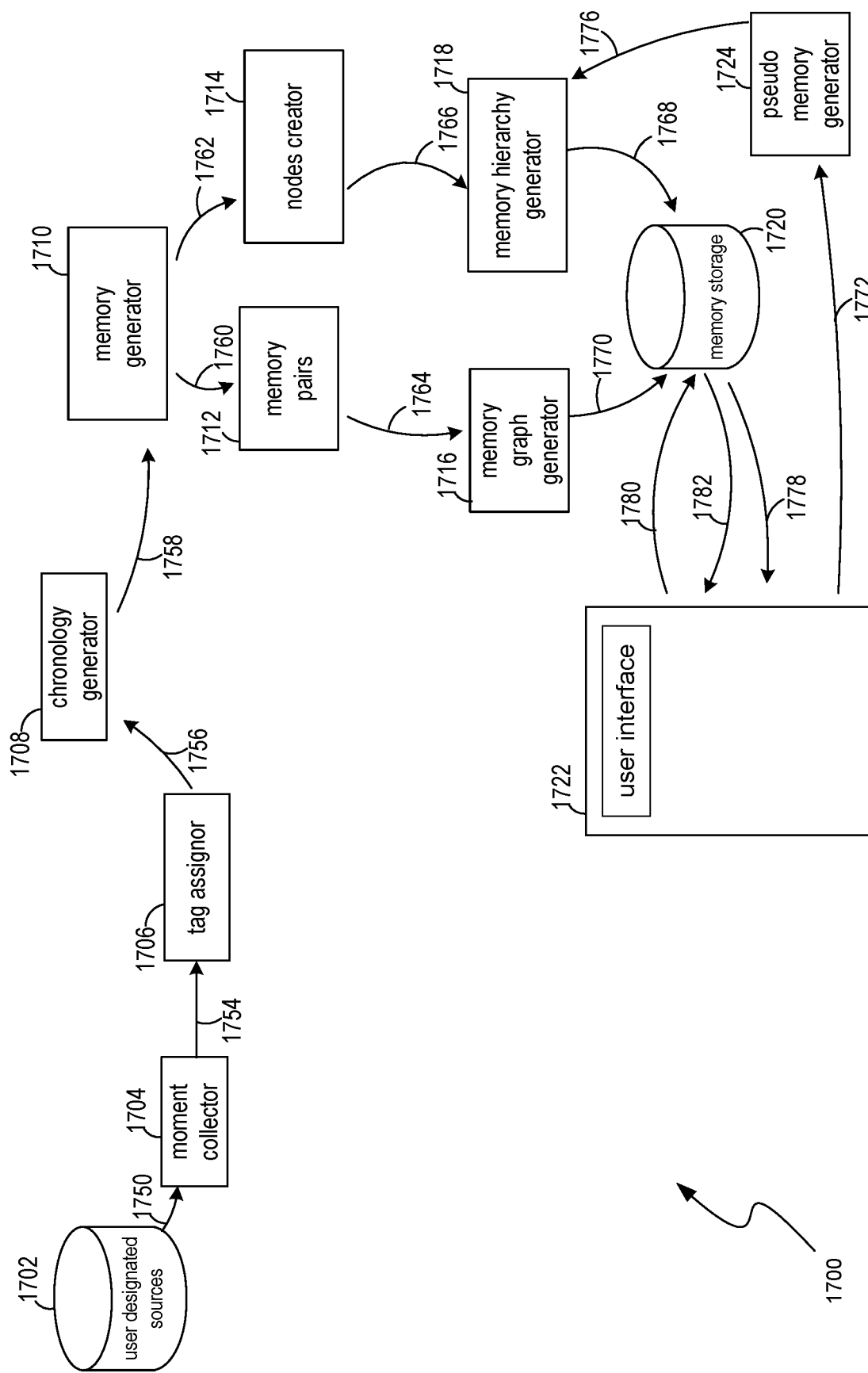
FIG. 17 is a block diagram illustrating a system used in some implementations of the present technology for creating and providing memories based on user captured moment content items and context.

FIG. 17 is a conceptual diagram illustrating an example 1700 of a system used in some implementations of the present technology for creating and providing memories based on moment content items and context. Example 1700 includes, user designated sources 1702, moment collector 1704, tag assignor 1706, chronology generator 1708, memory generator 1710, memory pairs 1712, nodes 1714, memory graph generator 1716, memory hierarchy generator 1718, memory storage 1720, user interface 1722, and pseudo memory generator 1724.

In operation, example 1700 begins with moment collector 1704 receiving moment content items from user designated sources 1702 at step 1750 (as described above in relation to blocks 502 and 602 of FIGS. 5 and 6). At step 1754, tag assignor 1706 assigns tags to the moment content items (as described above in relation to blocks 504 and 604 of FIGS. 5 and 6). At step 1756, chronology generator 1708 arranges the moment content items in a chronological order (as described above in relation to blocks 506 and 606 of FIGS. 5 and 6). At step 1758, the memory generator 1710 clusters the moment content items into memory content items (as described above in relation to blocks 508 and 608 of FIGS. 5 and 6).

At step 1760, the memory content items are formed into memory pairs by memory pairs 1712 (as described above in relation to block 804 of FIG. 8). At step 1764, the memory pairs are linked, in various dimensions, in a memory graph by memory graph generator 1716 (as described above in relation to blocks 806-814 of FIG. 8). At step 1770, the memory graph is stored in the memory storage 1720.

At 1762, the memory content items are arranged into nodes by nodes creator 1714 (as described above in relation to block 704 of FIG. 7). At step 1766, the nodes are arranged into a memory hierarchy by memory hierarchy generator 1718 (as described above in relation to blocks 705-709 of FIG. 7). At step 1768, the memory hierarchy is stored in the memory storage 1720.

At step 1772, the user interface 1722 sends search criteria for a memory to the pseudo memory generator 1724 (as described above in relation to block 902 of FIG. 9). Pseudo memory generator 1724 creates a pseudo memory (described above in relation to block 904 of FIG. 9) and at step 1776 passes the pseudo memory to memory hierarchy generator 1718 to map the pseudo memory into the memory hierarchy (described above in relation to block 906 of FIG. 9). At step 1778, the memories corresponding to nodes selected based on the mapping are selected from the memory storage 1720 and are provided to the user interface at 1778 as a response to the search criteria (described above in relation to block 908 of FIG. 9).

At step 1780, a user can select a provided memory as a starting point to browse additional memories (described above in relation to block 910 of FIG. 9). At step 1782, memories related to the selected memory through links in the memory graph and/or links in the memory hierarchy can be provided back to the user interface for further viewing or browsing by the user (described above in relation to block 912 of FIG. 9).

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for surfacing memory content items using one or more memory hierarchies, the method comprising:
   obtaining, from a user interface, memory content item search criteria;
     creating a pseudo memory based on the memory content item search criteria;

mapping the pseudo memory into the one or more memory hierarches by determining one or more nodes, of the one or more memory hierarches, with which the pseudo memory can be grouped according to grouping criteria of the one or more memory hierarches, wherein:
the one or more memory hierarches comprise first nodes that represent memory content items and second nodes that group memory contents items, and
the determined one or more nodes mapped to the pseudo memory comprise one or more of the second nodes;
providing one or more memory content items corresponding to the determined one or more nodes;
receiving, from the user interface, a selection of one or more memory content items, from the one or more provided memory content items; and
providing at least one additional memory content item based on one or more relationships, in one or more data structures including the one or more memory hierarches, to the one or more selected memory content items.

2. The method of claim 1, wherein the one or more relationships are relationships, in a graph memory structure with respect to one or more dimensions, among the least one additional memory content item and the one or more selected memory content items.

3. The method of claim 1, wherein the pseudo memory is created based on a current context of a user, the current context determined at least in part from sensor data of an artificial reality device.

4. The method of claim 1, wherein:
nodes in the one or more memory hierarches are associated with semantic tags;
the pseudo memory is created with semantic tags; and
the grouping criteria comprises an amount of semantic tags that must match between a node and the pseudo memory.

5. The method of claim 1, wherein the creating the pseudo memory comprises assigning one or more semantic tags to the pseudo memory based on one or both of: user-entered search terms and/or a determined context of the user comprising identified people, objects, or activities around the user.

6. The method of claim 1, wherein the providing the one or more memory content items further comprises displaying A) an indication of links in the one or more memory hierarches and/or B) links in a memory graph data structure defining connections between memory content items in a specified set of multiple dimensions.

7. The method of claim 1, wherein the selection of one or more memory content items is a first selection of a first memory content item, and wherein the method further comprises:
receiving, from the user interface, a second selection of a second memory content item, from the provided at least one memory content item;
receiving a selection of one or more dimensions of interest; and
providing one or more additional memory content items based on one or more relationships, in a memory graph data in the selected one or more dimensions of interest.

8. The method of claim 1, wherein the first nodes comprise leaf nodes of the one or more memory hierarches and the second nodes comprise non-leaf nodes of the one or more memory hierarches.

9. A computing system for surfacing memory content items using one or more memory hierarches, the computing system comprising:
one or more processors; and
one or more memories storing instructions that, when executed by the one or more processor, cause the computing system to perform a process comprising:
obtaining memory content item search criteria;
creating a pseudo memory based on the memory content item search criteria;
mapping the pseudo memory into the one or more memory hierarches by determining one or more nodes, of the one or more memory hierarches, with which the pseudo memory can be grouped according to grouping criteria of the one or more memory hierarches,
wherein:
the one or more memory hierarches comprise first nodes that represent memory content items and second nodes that group memory contents items, and
the determined one or more nodes mapped to the pseudo memory comprise one or more of the second nodes;
providing one or more memory content items corresponding to the determined one or more nodes;
receiving, from the user interface, a selection of one or more memory content items, from the one or more provided memory content items; and
providing at least one additional memory content item based on one or more relationships, in one or more data structures, to the one or more selected memory content items.

10. The computing system of claim 9, wherein the one or more relationships are relationships, in a graph memory structure with respect to one or more dimensions, among the least one additional memory content item and the one or more selected memory content items.

11. The computing system of claim 9, wherein the pseudo memory is created based on a current context of a user, the current context determined at least in part from sensor data of an artificial reality device.

12. The computing system of claim 9, wherein:
nodes in the one or more memory hierarches are associated with semantic tags;
the pseudo memory is created with semantic tags; and
the grouping criteria comprises an amount of semantic tags that must match between a node and the pseudo memory.

13. The computing system of claim 9, wherein the creating the pseudo memory comprises assigning one or more semantic tags to the pseudo memory based on one or both of: user-entered search terms and/or a determined context of the user comprising identified people, objects, or activities around the user.

14. The computing system of claim 9, wherein the providing the one or more memory content items further comprises displaying A) an indication of links in the one or more memory hierarches and/or B) links in a memory graph data structure defining connections between memory content items in a specified set of multiple dimensions.

15. The computing system of claim 9, wherein the selection of one or more memory content items is a first selection of a first memory content item, and wherein the process further comprises:

receiving, from the user interface, a second selection of a second memory content item, from the provided at least one memory content item;

receiving a selection of one or more dimensions of interest; and providing one or more additional memory content items based on one or more relationships, in a memory graph data structure in the selected one or more dimensions of interest.

16. A machine-readable storage medium having machine executable instructions stored thereon that, when executed by one or more processors, direct the one or more processors to perform a method for surfacing memory content items using one or more memory hierarchies, the method comprising:

obtaining memory content item search criteria;

creating a pseudo memory based on the memory content item search criteria;

mapping the pseudo memory into the one or more memory hierarchies by determining one or more nodes, of the one or more memory hierarches, with which the pseudo memory can be grouped according to grouping criteria of the one or more memory hierarches, wherein:

the one or more memory hierarchies comprise first nodes that represent memory content items and second nodes that group memory contents items, and the determined one or more nodes mapped to the pseudo memory comprise one or more of the second nodes;

providing one or more memory content items corresponding to the determined one or more nodes;

receiving, from the user interface, a selection of one or more memory content items, from the one or more provided memory content items; and providing at least one additional memory content item based on one or more relationships, in one or more data structures, to the one or more selected memory content items.

17. The machine-readable storage medium of claim 16, wherein the one or more relationships are relationships, in a graph memory structure with respect to one or more dimensions, among the least one additional memory content item and the one or more selected memory content items.

18. The machine-readable storage medium of claim 16, wherein the pseudo memory is created based on a current context of a user, the current context determined at least in part from sensor data of an artificial reality device.

19. The machine-readable storage medium of claim 16, wherein:

nodes in the one or more memory hierarchies are associated with semantic tags;

the pseudo memory is created with semantic tags; and the grouping criteria comprises an amount of semantic tags that must match between a node and the pseudo memory.

20. The machine-readable storage medium of claim 16, wherein the creating the pseudo memory comprises assigning one or more semantic tags to the pseudo memory based on one or both of: user-entered search terms and/or a determined context of the user comprising identified people, objects, or activities around the user.

* * * * *